(12) United States Patent
Suzuki et al.

(10) Patent No.: US 10,554,998 B2
(45) Date of Patent: Feb. 4, 2020

(54) IMAGE PREDICTIVE ENCODING AND DECODING SYSTEM

(71) Applicant: NTT DOCOMO, INC., Chiyoda-ku, Tokyo (JP)

(72) Inventors: Yoshinori Suzuki, Saitama (JP); Choong Seng Boon, Yokohama (JP); Thiow Keng Tan, Jalan Sindor (SG)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/477,463

(22) Filed: Sep. 4, 2014

(65) Prior Publication Data

US 2014/0369616 A1 Dec. 18, 2014

Related U.S. Application Data

(63) Continuation of application No. 13/857,724, filed on Apr. 5, 2013, now Pat. No. 8,873,874, which is a (Continued)

(30) Foreign Application Priority Data

Oct. 6, 2010 (JP) ................. 2010-226472

(51) Int. Cl.
*G06K 9/36* (2006.01)
*G06K 9/46* (2006.01)
(Continued)

(52) U.S. Cl.
CPC ............ *H04N 19/52* (2014.11); *G06T 9/004* (2013.01); *H04N 19/577* (2014.11)

(58) Field of Classification Search
CPC ........ H04N 19/00218; H04N 19/00733; G06T 7/2073; H03M 7/42
See application file for complete search history.

(56) References Cited

U.S. PATENT DOCUMENTS 6,259,739 B1 7/2001 Kondo
6,765,964 B1 7/2004 Conklin
(Continued)

FOREIGN PATENT DOCUMENTS

CN 101573985 A 11/2009
EP 2458863 A3 8/2014
(Continued)

OTHER PUBLICATIONS

International Search Report in corresponding International Application No. PCT/JP2011/072449, dated Jan. 10, 2012, 2 pages.
(Continued)

*Primary Examiner* — Vu Le
*Assistant Examiner* — Guillermo M Rivera-Martinez
(74) *Attorney, Agent, or Firm* — Brinks Gilson & Lione

(57) ABSTRACT

In image predictive encoding according to an embodiment, one or more motion information sets are derived from plural pieces of motion information stored in a computer readable storage medium. Each of the one or more information sets includes two pieces of motion information between which any one of constituent elements differ in value. A predicted signal of a target region in a picture is generated by motion compensation, using two pieces of motion information in a motion information set selected from the one or more motion information sets. The two pieces of motion information in the selected motion information set are stored in the computer readable storage medium, and are used for generation of a predicted signal of another region.

1 Claim, 17 Drawing Sheets

Related U.S. Application Data continuation of application No. PCT/JP2011/072449, filed on Sep. 29, 2011.

(51) Int. Cl.
*H04N 19/52* (2014.01)
*H04N 19/577* (2014.01)
*G06T 9/00* (2006.01)

(56) References Cited

U.S. PATENT DOCUMENTS

| | | | |
|---|---|---|---|
| 7,003,035 B2 | 2/2006 | Tourapis et al. | |
| 7,369,709 B2 | 5/2008 | Hsu et al. | |
| 7,609,763 B2 | 10/2009 | Mukerjee et al. | |
| 7,822,120 B2 * | 10/2010 | Kondo et al. | 375/240.16 |
| 8,254,455 B2 | 8/2012 | Wu et al. | |
| 8,873,874 B2 | 10/2014 | Suzuki et al. | |
| 2004/0008784 A1 | 1/2004 | Kikuchi et al. | |
| 2004/0013308 A1 | 1/2004 | Jeon et al. | |
| 2004/0052507 A1 | 3/2004 | Kondo et al. | |
| 2004/0264570 A1 | 12/2004 | Kondo et al. | |
| 2005/0117646 A1 * | 6/2005 | Joch | H04N 19/51 375/240.16 |
| 2005/0152452 A1 | 7/2005 | Suzuki | |
| 2006/0133498 A1 | 6/2006 | Park et al. | |
| 2006/0188021 A1 * | 8/2006 | Suzuki et al. | 375/240.16 |
| 2007/0014359 A1 * | 1/2007 | Gomila et al. | 375/240.16 |
| 2007/0183499 A1 | 8/2007 | Kimata et al. | |
| 2008/0019597 A1 | 1/2008 | Song | |
| 2008/0095237 A1 | 4/2008 | Hussain et al. | |
| 2008/0107180 A1 | 5/2008 | Lee et al. | |
| 2008/0126278 A1 | 5/2008 | Bronstein et al. | |
| 2009/0003446 A1 * | 1/2009 | Wu et al. | 375/240.16 |
| 2009/0034856 A1 | 2/2009 | Moriya et al. | |
| 2009/0067498 A1 * | 3/2009 | Jeon | 375/240.15 |
| 2009/0190844 A1 | 7/2009 | Park et al. | |
| 2009/0226103 A1 | 9/2009 | Choi et al. | |
| 2009/0232206 A1 | 9/2009 | Boon et al. | |
| 2009/0245373 A1 | 10/2009 | Tourapis et al. | |
| 2011/0097004 A1 | 4/2011 | Lee et al. | |
| 2011/0206119 A1 | 8/2011 | Bivolarsky et al. | |
| 2011/0206132 A1 | 8/2011 | Bivolarsky et al. | |
| 2012/0093217 A1 * | 4/2012 | Jeon | H04N 19/46 375/240.02 |
| 2012/0128060 A1 * | 5/2012 | Lin et al. | 375/240.02 |
| 2013/0107959 A1 * | 5/2013 | Park et al. | 375/240.15 |
| 2013/0177076 A1 | 7/2013 | Itani et al. | |
| 2014/0369616 A1 | 12/2014 | Suzuki et al. | |
| 2015/0003533 A1 * | 1/2015 | Suzuki | H04N 19/176 375/240.16 |

FOREIGN PATENT DOCUMENTS

| | | |
|---|---|---|
| JP | 2004-023458 A | 1/2004 |
| JP | 2004-056756 A | 2/2004 |
| JP | 2004-208258 A | 7/2004 |
| JP | 5575910 B2 | 8/2014 |
| JP | 5982537 B2 | 8/2016 |
| WO | WO 2004/008775 A1 | 1/2004 |
| WO | WO 2006/019093 A1 | 2/2006 |
| WO | WO 2012/046637 A1 | 4/2012 |

OTHER PUBLICATIONS

Wiegand, Thomas et al., "Overview of the H.264/AVC Video Coding Standard," *IEEE Transactions on Circuits and Systems for Video Technology*, Jul. 2003, vol. 13, pp. 1-19.

Notice of Reasons for Rejection, and English language translation thereof, in corresponding Japanese Application No. 2014-136834, dated Feb. 17, 2015, 5 pages.

Kamp, Steffen et al., "Description of video coding technology proposal by RWTH Aachen University," *Joint Collaborative Team on Video Coding (JCT-VC) of ITU-T SG16 WP3 and ISO/IEC JTC1/SC29/WG11*, 1st Meeting: Dresden, Germany, Apr. 15-23, 2010, 24 pages, Document XP030007549, ISSN: 0000-0049.

Extended European Search Report in European Application No. 11830569.7, dated Jun. 23, 2015, 9 pages.

Office Action and Search Report, and English language translation thereof, in Chinese Application No. 201180046286.1, dated Sep. 6, 2015, 19 pages.

Novelty Examination Communication in corresponding Mexican Application No. MX/a/2014/013805, dated Mar. 23, 2015, 13 pages.

Office Action, and English language translation thereof, in Russian Application No. 2013120007/07(029608) dated Sep. 11, 2015, 9 pages.

Patent Examination Report No. 1 in corresponding Australian Application No. 2015202089 dated Nov. 27, 2015, 3 pages.

Davies (BBC), "Video coding technology proposal by BBC (and Samsung)", *JCTVC-A125*, Apr. 16, 2010, XP030007575, 32 pages.

Office Action in corresponding European Application No. 11830569.7, dated Feb. 19, 2016, 7 pages.

Office Action in corresponding European Application No. 15191817.4, dated Feb. 22, 2016, 8 pages.

Office Action, and English language translation therein, in corresponding Indonesian Application No. W00201301915, dated Feb. 22, 2016, 4 pages.

Office Action, and English language translation therein, in corresponding Korean Application No. 10-2015-7020755, dated May 13, 2016, 7 pages.

Office Action in corresponding European Application No. 11830569.7, dated Mar. 1, 2017, 8 pages.

Office Action, and English language translation thereof, in corresponding Korean Application No. 10-2016-7015636, dated Oct. 6, 2016, 7 pages.

Office Action in corresponding Australian Application No. 2015202089, dated Sep. 30, 2016, 3 pages.

Office Action, and English language translation thereof, in corresponding Russian Application No. 2016106109, dated Oct. 3, 2016, 7 pages.

Office Action, and English language translation thereof, in corresponding Korean Application No. 10-2016-7027392, dated Oct. 17, 2016, 7 pages.

Office Action, and English language translation therefore, in corresponding Chinese Application No. 201180046286.1, dated Jan. 6, 2017, 17 pages.

Office Action in U.S. Appl. No. 15/408,990, dated May 31, 2017, 20 pages.

Office Action, and English language translation thereof, in corresponding Chinese Application No. 201610809318.3, dated Jun. 14, 2017, 13 pages.

Office Action, and English language translation thereof, in corresponding Korean Application No. 10-2017-7016501, dated Jul. 27, 2017, 7 pages.

Office Action in corresponding Australian Application No. 2016253586, dated Aug. 24, 2017, 3 pages.

Office Action, and English language translation thereof, in corresponding Chinese Application No. 201510737329.0, dated Jul. 4, 2017, 12 pages.

Office Action in corresponding European Application No. 15191817.4, dated Jul. 10, 2017, 6 pages.

Office Action, and English language translation thereof, in corresponding Chinese Application No. 201180046286.1, dated Aug. 25, 2017, 14 pages.

Office Action, and English language translation thereof, in corresponding Japanese Application No. P2016-151416, dated Sep. 5, 2017, 8 pages.

Office Action in U.S. Appl. No. 15/408,990, dated Nov. 29, 2017, 16 pages.

Korean Patent Office, Office Action in Korean Application No. 10-2018-06593, dated Apr. 10, 2018, 8 pages.

Canadian Patent Office, Office Action/Requisition in Canadian Application No. 2,973,344 dated May 14, 2018, pp. 1-7.

Office Action in U.S. Appl. No. 15/408,990 dated Apr. 17, 2018, 20 pages.

(56) References Cited

OTHER PUBLICATIONS

European Patent Office, Office Action from European Application No. 11830569.7 dated Apr. 10, 2018, pp. 1-5.
Office Action in Chinese Patent Application No. 201610809316.4, including English translation, dated Aug. 13, 2018, pp. 1-13.
2nd Notification of Office Action in Chinese Application No. 201610809317.9 dated Mar. 5, 2018, 15 pages.
Office Action in U.S. Appl. No. 15/408,990, dated Nov. 14, 2018, pp. 1-36.
Office Action in Korean Appln 10-2018-7034512, dated Feb. 14, 2019, 8 pages.
Office Action in Australian Appln 2018204301, dated Jan. 10, 2019, 3 pages.
Office Action in Indian Appln 2529/DELNP/2013, dated Feb. 28, 2019, 7 pages.
Office Action in Europe Application No. 15191817.4, dated Nov. 28, 2018, pp. 1-7.
Office Action/Notice of Panel Decision from Pre-Appeal Brief Review, in U.S. Appl. No. 15/408,990, dated Apr. 8, 2019, 5 pages.
Office Action in U.S. Appl. No. 15/408,990, dated Feb. 28, 2018, 6 pages.
Office Action in U.S. Appl. No. 16/504,925 dated Oct. 3, 2019, 29 pages.
Office Action in U.S. Appl. No. 16/504,851 dated Oct. 3, 2019, 28 pages.
Office Action in U.S. Appl. No. 16/504,901 dated Oct. 3, 2019, 30 pages.
Office Action in U.S. Appl. No. 16/504,879 dated Oct. 3, 2019, 30 pages.
Office Action in Korea Application No. 10-2019-7031118, dated Nov. 7, 2019, 8 pages.

\* cited by examiner

| ref_idx | List0 | List1 |
|---|---|---|
| 0 | frame_num=3 | frame_num=2 |
| 1 | frame_num=2 | frame_num=3 |
| 2 | frame_num=1 | frame_num=0 |
| 3 | frame_num=0 | frame_num=1 |

(B) 522

| ref_idx | List0 | List1 |
|---|---|---|
| 0 | frame_num=2 | frame_num=4 |
| 1 | frame_num=1 | - |
| 2 | frame_num=0 | - |

(C) 523

| ref_idx | List0 | List1 |
|---|---|---|
| 0 | frame_num=2 | frame_num=4 |
| 1 | frame_num=1 | frame_num=2 |
| 2 | frame_num=0 | frame_num=1 |
| 3 | frame_num=4 | frame_num=0 | even if a set of two pieces of motion information of
IMAGE PREDICTIVE ENCODING AND DECODING SYSTEM

RELATED APPLICATIONS

This application is continuation of U.S. patent application Ser. No. 13/857,724 filed on Apr. 5, 2013, which is a continuation of PCT/JP2011/072449, filed Sep. 29, 2011, which claims the benefit of the filing date pursuant to 35 U.S.C. § 119(e) of JP2010-226472, filed Oct. 6, 2010, all of which are incorporated herein by reference.

TECHNICAL FIELD

Embodiments of the present invention relate to an image predictive encoding device, an image predictive encoding method, an image predictive encoding program, an image predictive decoding device, an image predictive decoding method, and an image predictive decoding program and, more particularly, to an image predictive encoding device, an image predictive encoding method, an image predictive encoding program, an image predictive decoding device, an image predictive decoding method, and an image predictive decoding program to generate a predicted signal of a target block, using motion information of neighboring blocks.

BACKGROUND ART

The compression encoding technologies are used for efficient transmission and storage of still pictures and video data. The techniques defined in MPEG-1 to 4 and ITU (International Telecommunication Union) H.261 to H.264 are commonly used for video data.

SUMMARY

Bi-predictive prediction involves averaging of two similar predicted signals, whereby noise in the predicted signals can be more effectively removed by a smoothing effect. For this purpose, it is effective to acquire two signals with slightly different motion vectors from an identical reference picture. In bi-predictive prediction using the motion information of neighboring blocks, the selection of motion information to be used in generation of two predicted signals can be restricted by reference picture lists. Because of this restriction, even if a set of two pieces of motion information of neighboring blocks include motion vectors of close values based on the same reference picture, they cannot be selected.

In the example of FIG. 7, an illustrated block 400 is an encoding target block and blocks 401 to 403 are neighboring blocks to the target block, each of the three neighboring blocks may have two pieces of motion information identified by List0 and List1. The two predicted signals can be generated by selecting one of the three pieces of motion information identified by List0 and one of the three pieces of motion information identified by List1, which are the motion information of the three neighboring blocks. In general, a bit count for reference index ref_idx can become smaller when the reference index ref_idx is "0"; therefore, it can be the case that all the reference indices ref_idx in the motion information of neighboring blocks are 0. In the case where the reference index is "0," use of the reference picture lists (521) in (A) of the example of FIG. 6 can result in acquiring two predicted signals from a reference picture with the frame number (frame_num) of "3" and from a reference picture with the frame number of "2," respectively. In this case, it is not feasible to achieve a high smoothing effect.

As another example, two reference picture lists can be composed of different reference pictures. In the case, as shown in (B) of the example of FIG. 6, where a picture 510 identified by the frame number of "3" is an encoding target picture, where pictures 507, 508, 509, and 511 identified by the frame numbers of "0," "1," "2," and "4", respectively, are reconstructed pictures, and where the reference picture lists are lists 522 shown in (B) of the example of FIG. 6, the two predicted signals can be generated from different reference pictures. In this case, it is also not feasible to achieve a high smoothing effect.

An aspect of the image predictive encoding and decoding system relates to image predictive encoding.

The image predictive encoding and decoding system may include an image predictive encoding device. The image predictive encoding device can include a region partition means which partitions an input picture into a plurality of regions; predicted signal generation means which determines motion information for acquisition of a pixel signal having a high correlation with a pixel signal of a target region of an encoding target out of the plurality of regions partitioned by the region partition means, from a reconstructed picture, and which generates a predicted signal of the target region from the reconstructed picture on the basis of the motion information; motion information recording means which stores the motion information; residual signal generation means which generates a residual signal of a difference between the predicted signal of the target region and the pixel signal of the target region; residual signal encoding means which encodes the residual signal generated by the residual signal generation means; residual signal reconstruction means which decodes encoded data generated by the residual signal encoding means, to generate a reconstructed residual signal; addition means which adds the predicted signal to the reconstructed residual signal to generate a reconstructed pixel signal of the target region; and picture recording means which stores the reconstructed pixel signal generated by the addition means, as a part of a reconstructed picture. The predicted signal generation means comprises: motion information derivation means which derives one or more motion information sets from plural pieces of motion information stored in the motion information recording means, each of the one or more motion information sets consisting of two pieces of motion information between which any one of constituent elements differs in value. The image predictive encoding device can also include motion prediction information selection means which selects a motion information set to be used in generation of the predicted signal of the target region, from the one or more motion information sets and which directs storage of two pieces of motion information included in the selected set in the motion information recording means; and motion compensation means which combines two signals acquired from the reconstructed picture based on the two pieces of motion information in the selected set, to generate the predicted signal of the target region.

The image predictive encoding and decoding system may perform an image predictive encoding method comprising: partitioning an input picture into a plurality of regions; generating a predicted signal of a target region of an encoding target out of the plurality of regions, said generating including determining motion information for acquisition of a pixel signal having a high correlation with a pixel signal of the target region from a reconstructed picture and generating the predicted signal from the reconstructed picture on the basis of the motion information; storing the motion information with motion information recording means; generating a residual signal of a difference between the predicted signal of the target region and the pixel signal of the target region; encoding the residual signal; decoding encoded data generated during said encoding of the residual signal, to generate a reconstructed residual signal; adding the predicted signal to the reconstructed residual signal to generate a reconstructed pixel signal of the target region; and storing the reconstructed pixel signal as a part of a reconstructed picture, by picture recording means. In addition, the step of generating the predicted signal comprises: deriving one or more motion information sets out of plural pieces of motion information stored in the motion information recording means, each consisting of two pieces of motion information between which any one of constituent elements differs in value; selecting, from the one or more motion information sets, a motion information set to be used in generation of the predicted signal of the target region, and directing storage of two pieces of motion information in the selected set in the motion information recording means; and combining two signals acquired from the reconstructed picture on the basis of the two pieces of motion information in the selected set, to generate the predicted signal of the target region.

The image predictive encoding and decoding system may also include an image predictive encoding program that makes a computer function as the region partition means, the predicted signal generation means, the motion information recording means, the residual signal generation means, the residual signal encoding means, the residual signal reconstruction means, the addition means, and the picture recording means. The predicted signal generation means comprises the motion information derivation means, the prediction information selection means, and the motion compensation means.

Image predictive encoding with the image predictive encoding and decoding system permits two pieces of motion information between which any constituent element differs in value to be selected without being restricted by reference picture lists. As a result, the effect of smoothing can be achieved in the generation of the predicted signal.

In an embodiment, the image predictive encoding of the image predictive encoding and decoding system may be configured as follows: the picture recording means can store a plurality of reconstructed pictures, each piece of the motion information contains information to identify the reconstructed picture, and a motion vector, the reconstructed pictures stored in the picture recording means are identified using respective frame numbers in encoding of the reconstructed pictures, and a derived motion information set is a motion information set including two pieces of motion information having an identical frame number of the reconstructed picture and different values of motion vectors.

In an embodiment, the image predictive encoding of the image predictive encoding and decoding system may be configured as follows: the picture recording means can store a plurality of reconstructed pictures, the plurality of reconstructed pictures stored in the picture recording means are identified using two reference picture lists each consisting of one or more reconstructed pictures, each piece of the motion information contains information to identify the two reference picture lists, and the motion vector, and a derived motion information set is a motion information set including two pieces of motion information having identical information to identify the reference picture lists, and different values of motion vectors.

In an embodiment, the image predictive encoding of the image predictive encoding and decoding system may be configured as follows: the motion information set to be used in generation of the predicted signal of the target region can be selected from plural pieces of motion information associated with a region neighboring the target region.

In an embodiment, the image predictive encoding of the image predictive encoding and decoding system may be configured as follows: information to indicate the selected motion information set consisting of the two pieces of motion information can be encoded.

Another aspect of the image predictive encoding and decoding system relates to image predictive decoding.

The image predictive encoding and decoding system can include an image predictive decoding device. The image predictive decoding device can include: data analysis means which extracts encoded data of motion information for generation of a predicted signal of a target region of a decoding target out of a plurality of regions in a picture, and encoded data of a residual signal from compressed data; motion information recording means which stores the motion information; motion compensation means which generates the predicted signal of the target region on the basis of the motion information; residual signal decoding means which decodes a residual signal of the target region from the encoded data of the residual signal; picture recording means which adds the predicted signal to the decoded residual signal to restore a pixel signal of the target region, and which stores the restored pixel signal as a part of a reconstructed picture; motion information derivation means which derives, from plural pieces of motion information stored in the motion information recording means, one or more motion information sets each consisting of two pieces of motion information between which any one of constituent elements differs in value; and motion information determination means which determines a motion information set to be used in generation of the predicted signal of the target region, out of the one or more motion information sets derived, and which directs storage of two pieces of motion information in the determined set in the motion information recording means, wherein the motion compensation means combines two signals acquired from the reconstructed picture on the basis of the two pieces of motion information in the determined set, to generate the predicted signal of the target region.

The image predictive encoding and decoding system can also perform an image predictive decoding method that includes: extracting encoded data of motion information for generation of a predicted signal of a target region of a decoding target out of a plurality of regions in a picture, and encoded data of a residual signal from compressed data; storing the motion information with motion information recording means; generating the predicted signal of the target region on the basis of the motion information; restoring a decoded residual signal of the target region from encoded data of the residual signal; adding the predicted signal to the decoded residual signal to restore a pixel signal of the target region, and storing the restored pixel signal as a part of a reconstructed picture with picture recording means; deriving one or more motion information sets out of plural pieces of motion information stored in the motion information recording means, each of the one or more motion information sets consisting of two pieces of motion information between which any one of constituent elements differ in value; and determining a motion information set to be used in generation of the predicted signal of the target region from among the derived motion information sets, and directing storage of two pieces of motion information in the determined set in the motion information recording means, wherein the step of generating the predicted signal comprises combining two signals acquired from the reconstructed picture on the basis of the two pieces of motion information in the determined set, to generate the predicted signal of the target region.

The image predictive encoding and decoding system can also include an image predictive decoding program that makes a computer function as the data analysis means, the motion information recording means, the motion compensation means, the residual signal decoding unit, the picture recording means, the motion information derivation means, and the motion information determination means.

The image predictive encoding and decoding system can perform image predictive decoding that allows a picture to be restored from compressed data generated by the image predictive encoding of the aforementioned aspect. Noise can be reduced in this restored picture.

In an embodiment, the image predictive decoding performed by the image predictive encoding and decoding system may include extracting encoded data of indication information, the encoded data extracted out of plural pieces of motion information stored in the motion information recording means to identify one motion information set consisting of two pieces of motion information between which any one of constituent elements differ in value, making prediction information decoding means decode the indication information, and extracting a motion information set to be used in generation of the predicted signal of the target region, out of the one or more motion information sets derived by the motion information derivation means, based on the decoded indication information.

In an embodiment, the image predictive decoding by the image predictive encoding and decoding system may be configured as follows: the picture recording means can store a plurality of reconstructed pictures, the motion information contains information to identify the plurality of reconstructed pictures, and motion vectors, the plurality of reconstructed pictures stored in the picture recording means are identified using respective frame numbers in decoding of the respective reconstructed pictures, and a derived motion information set is a motion information set including two pieces of motion information having an identical frame number of the reconstructed picture and different values of motion vectors.

In an embodiment, the image predictive decoding of the image predictive encoding and decoding system may be configured as follows: the picture recording means can store a plurality of reconstructed pictures, the plurality of reconstructed pictures stored in the picture recording means are identified using two reference picture lists each consisting of one or more reconstructed pictures, each piece of the motion information is configured containing information to identify the two reference picture lists, and the motion vector, and a derived motion information set is a motion information set including two pieces of motion information having identical information to identify the reference picture lists, and different values of motion vectors.

In an embodiment, the image predictive decoding of the image predictive encoding and decoding system may be configured as follows: the motion information set to be used in generation of the predicted signal of the target region can be derived from plural pieces of motion information associated with a region neighboring the target region.

As described above, the system can include the image predictive encoding device, image predictive encoding method, image predictive encoding program, image predictive decoding device, image predictive decoding method, and image predictive decoding program capable of suppressing noise of the predicted signal.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF DRAWINGS

The system, may be better understood with reference to the following drawings and description. The components in the figures are not necessarily to scale, emphasis instead being placed upon illustrating the principles of the system. Moreover, in the figures, like referenced numerals designate corresponding parts throughout the different views.

FIG. 6 is a drawing for explaining examples of reference picture lists.

DESCRIPTION OF EMBODIMENTS

Figure 1:
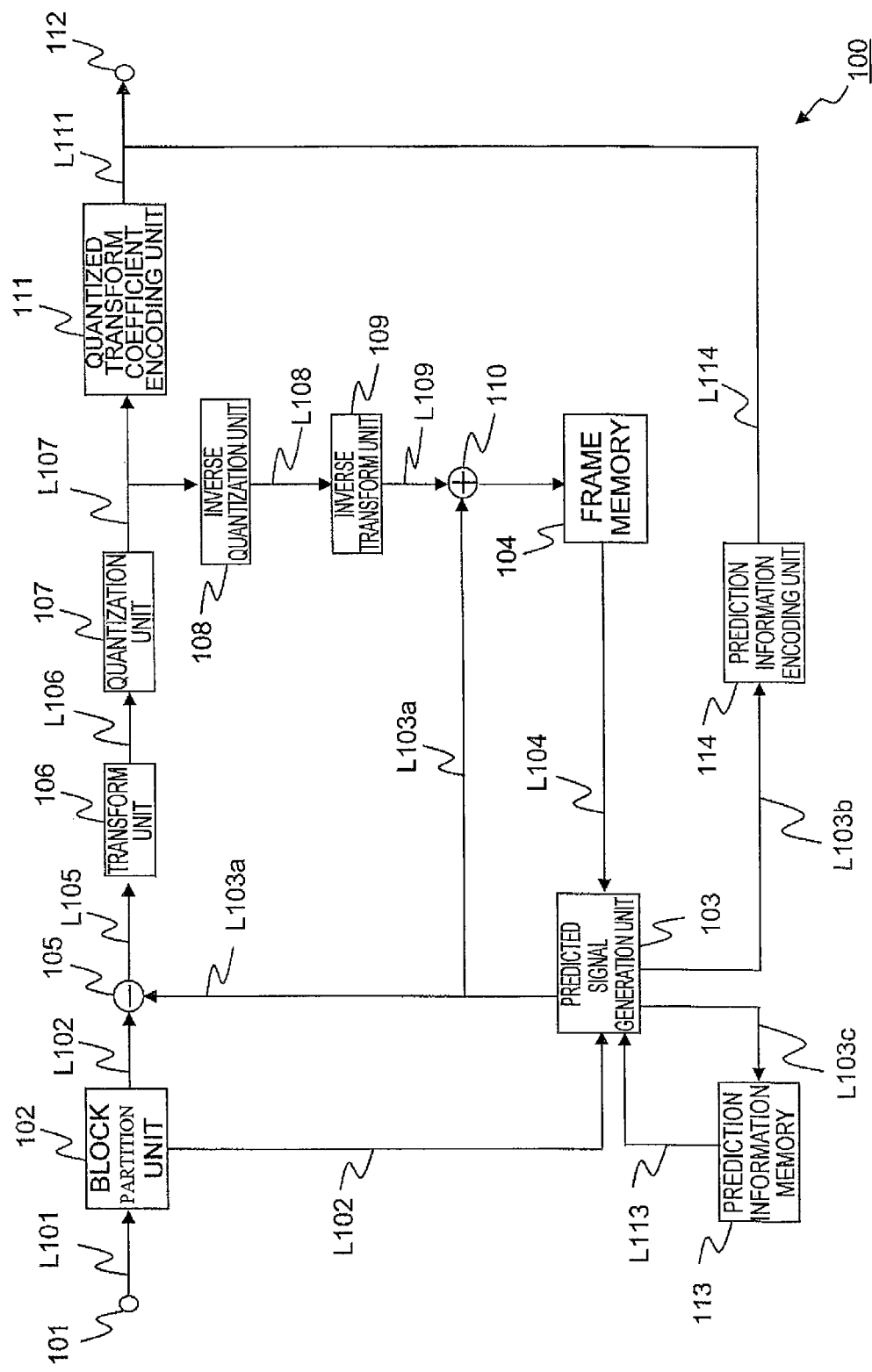
FIG. 1 illustrates an example configuration of an image predictive encoding device according to an embodiment.

Some embodiments will be described below in detail with reference to the drawings. In the drawings identical or equivalent portions will be denoted by the same reference signs, without redundant description. In the present specification, "frames," "pictures," and "images" (such as 501 to 511 in FIG. 5) mean the same thing.

In some example encoding techniques, a picture as an encoding target is partitioned into a plurality of blocks and then an encoding process and a decoding process are carried out on a block basis. In intra-picture predictive encoding, a predicted signal can be generated using a previously-reproduced picture signal (or a restored signal of compressed picture data) of a neighboring region present in the same picture as a target block and then a difference signal of a difference between the predicted signal and a pixel signal of the target block can be encoded. In inter-picture predictive encoding, a predicted signal can be generated with compensation for motion with reference to a previously-reproduced picture signal of a neighboring region present in a picture different from a target block, and a difference signal of a difference between the predicted signal and a signal of the target block can be encoded.

Figure 17:
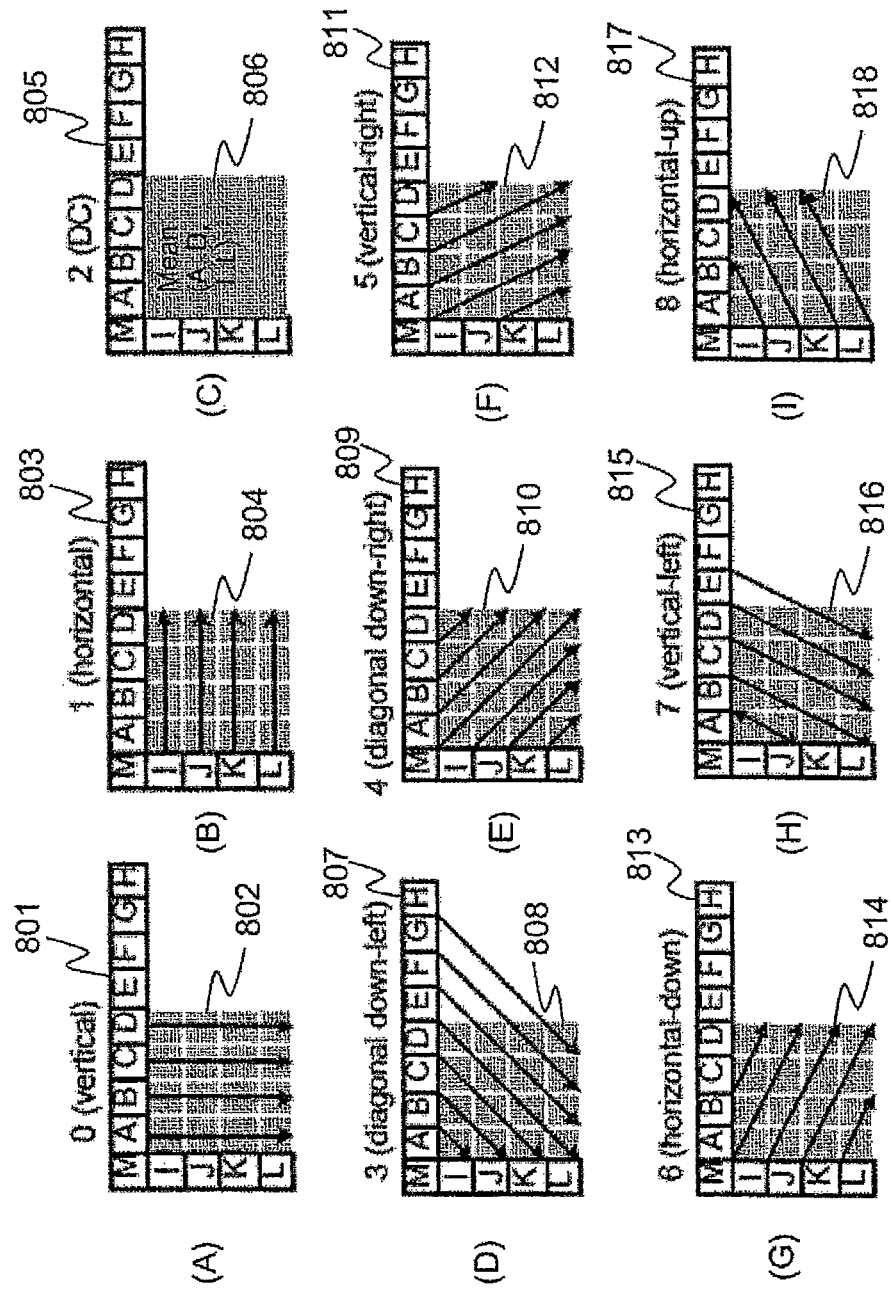
FIG. 17 is a schematic diagram for explaining an example of intra-picture prediction.

Intra-picture predictive encoding, such as using H.264, can include generating the predicted signal by extrapolating previously-reproduced pixel values of a region adjacent to a block serving as an encoding target, in predetermined directions. FIG. 17 is a schematic diagram example for explaining an intra-picture prediction method, such as the method used in ITU H.264. In (A) of FIG. 17, a target block 802 is a block serving as an encoding target, and a pixel group 801 consisting of pixels A to M adjacent to a boundary of the target block 802 is a neighboring region, which is a picture signal previously reproduced in past processing.

In the prediction shown in (A) of FIG. 17, the predicted signal is generated by downwardly extending the pixel group 801 as neighboring pixels located immediately above the target block 802. In the prediction shown in (B) of FIG. 17, the predicted signal is generated by rightwardly extending previously-reproduced pixels (I to L) located on the left side of the target block 804. A difference can be calculated between each of nine predicted signals generated by the methods shown in (A) to (I) of FIG. 17 in the above-described manner, and the pixel signal of the target block. These obtained differences can be compared to select a candidate to provide a minimum difference, as an optimum predicted signal. As described above, the predicted signal can be generated by extrapolation of pixels.

In an example of inter-picture predictive encoding, the predicted signal can be generated by searching previously-reproduced pictures for a signal similar to the pixel signal of the target block. Then encoding can be performed of a motion vector as a spatial displacement amount between the target block and a region composed of the detected signal, and a residual signal of the difference between the pixel signal of the target block and the predicted signal. The searching technique for the motion vector for each block as described above may be described as block matching.

Figure 16:
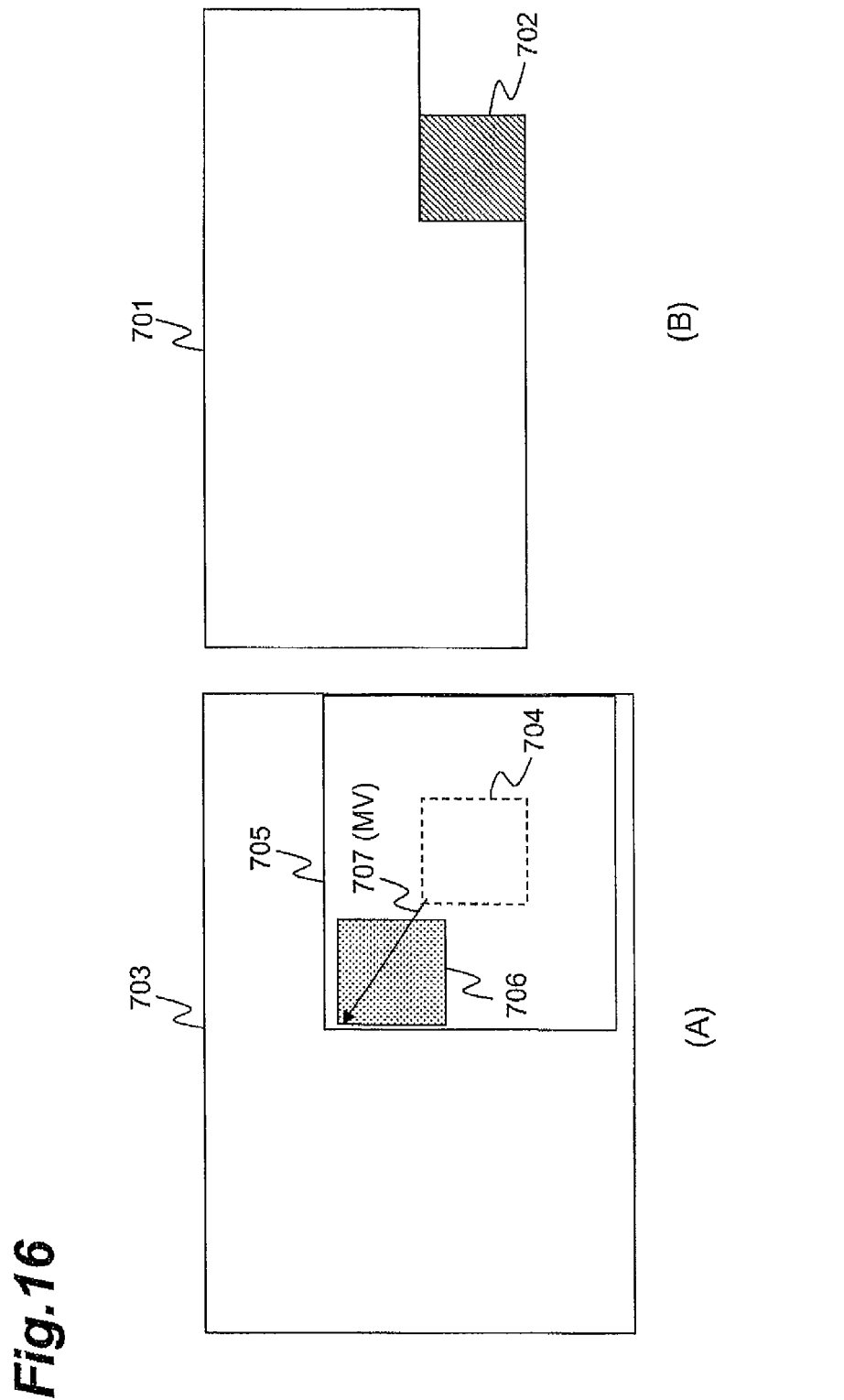
FIG. 16 is a schematic drawing for explaining an example of a motion estimation process in inter-picture prediction.

FIG. 16 is a schematic diagram for explaining an example of a block matching process. The below will describe an example procedure for generating a predicted signal for an example of a target block 702 on an encoding target picture 701. A picture 703 is a previously-reproduced picture and a region 704 in the previously-reproduced picture is a region located spatially at the same position as the target block 702. In the block matching, a search range 705 that includes the region 704 is set. A region 706 with a signal to minimize the sum of absolute differences from the pixel signal of the target block 702 is detected from this search range. The signal of this region 706 is determined to be a predicted signal, and a displacement amount from the region 704 to the region 706 is detected as a motion vector 707. An example process includes preparing a plurality of reference pictures, selecting a reference picture to be applied to block matching for each target block, and detecting reference picture selection information. In some cases, such as in H.264, a plurality of prediction types of different block sizes are prepared for encoding of motion vector, in order to adapt for local feature changes of pictures.

In compression encoding of video data, an encoding order of pictures (frames or fields) may be optional. A number of different types of techniques, such as three types of techniques, can be used regarding the encoding order in inter-picture prediction to generate the predicted signal with reference to previously-reproduced pictures. A first technique may use forward prediction to generate the predicted signal with reference to a past previously-reproduced picture in a display order, a second technique is backward prediction to generate the predicted signal with reference to a future previously-reproduced picture in the display order, and a third technique is bidirectional prediction to perform both forward prediction and backward prediction and average two predicted signals.

In some encoding examples, such as in H.264, the third technique can be performed using reference picture lists, such as two reference pictures lists. Each of the reference picture lists may consist of a plurality of previously-reproduced pictures as candidates for a reference picture. In an example, the block matching may be carried out using the plurality of reference pictures registered in each reference picture list to detect two regions corresponding to the region 706, and two predicted signals thus detected can be averaged.

An example of reference picture lists will be described with FIGS. 5 and 6. In (A) of FIG. 5, a picture 505 indicates an encoding target picture and pictures 501 to 504 indicate reconstructed pictures. Each image (picture) is identified by a frame number (frame_num). Reference picture list identification List0 and List1 in (A) of FIG. 6 indicate two reference picture lists and in this example, four reference pictures are registered in each of the two reference picture lists. Each reference picture can be identified by a reference index (ref_idx).

Reconstructed pictures that can be registered in the reference picture lists are basically optional. As in the example table 521 shown in (A) of FIG. 6, all the reference pictures registered in the two reference picture lists may be past reconstructed pictures. Since the two predicted signals both are forward predicted signals in this case, the prediction technique to average the two predicted signals may be called bi-predictive prediction, instead of the bidirectional prediction.

In bi-predictive prediction, two combinations (motion information) of motion vectors and reference indices may be encoded. Therefore, in order to decrease the bit count, a technique of performing the bi-predictive prediction using the motion information identified by List0 and the motion information identified by List1, out of the motion information of neighboring blocks, may be used.

FIG. 1 is a drawing showing an example configuration of an image predictive encoding device 100 according to an example embodiment of the image predictive encoding and decoding system. The image predictive encoding device 100 may be a computing device or computer, including for example software, hardware, or a combination of hardware and software, as described later, capable of performing the described functionality. The image predictive encoding device 100 may be one or more separate systems or devices included in the image predictive encoding and decoding system, or may be combined with other systems or devices within the image predictive encoding and decoding system. In other examples, fewer or additional blocks may be used to illustrate the functionality of the image predictive encoding device 100. The image predictive encoding device 100 shown in FIG. 1 includes an input terminal 101, a block partition unit 102, a predicted signal generation unit 103, a frame memory 104, a subtraction unit 105, a transform unit 106, a quantization unit 107, an inverse quantization unit 108, an inverse transform unit 109, an addition unit 110, a quantized transform coefficient encoding unit 111, an output terminal 112, a prediction information memory 113, and a prediction information encoding unit 114. The term "unit" is defined to include one or more executable parts of an image predictive encoding device or an image predictive decoding device. As described herein, the units are defined to include software, hardware, or some combination thereof executable by a processor (described later). Software included in the units may include instructions stored in memory, or any other computer readable storage medium, that are executable by the processor, or any other processor. Hardware included in the units may include various devices, components, circuits, gates, circuit boards, and the like that are executable, directed, and/or controlled for performance by the processor. In an embodiment, the transform unit 106 and the quantization unit 107 function as residual signal encoding unit or means, the inverse quantization unit 108 and the inverse transform unit 109 function as residual signal reconstruction unit or means, and the prediction information memory 113 functions as motion information recording unit or means. It is noted that the prediction information memory 113 may be incorporated in the predicted signal generation unit 103. In an embodiment, the quantized transform coefficient encoding unit 111 may also function as a part of the residual signal encoding unit or means and, in this case, an element that decodes data generated by the quantized transform coefficient encoding unit 111 and outputs the decoded data to the inverse quantization unit 108 constitutes a part of the residual signal reconstruction unit. Also, the block division unit 102 may function as a region partition means. Further, the frame memory 104 and the prediction information memory 113 may be one or more computer readable storage medium, as described later.

The input terminal 101 is a terminal that implements input of a signal of a video sequence consisting of a plurality of pictures.

The block partition unit 102 partitions each picture of an encoding target represented by a signal input from the input terminal 101, into a plurality of regions. In an embodiment, an encoding target picture may be partitioned into a plurality of blocks each consisting of 8×8 pixels. These regions or blocks are target regions or target blocks to which the processing described below is applied. The size and shape of blocks are not limited to this example. Blocks of different sizes may be mixed in each picture.

The predicted signal generation unit 103 detects motion information necessary for generation of a predicted signal of each prediction block in a target block and generates the predicted signal. There are no particular restrictions on a method of generation of the predicted signal, but it may be the inter-picture prediction or the intra-picture prediction as described in the background art (though the intra-picture prediction is not illustrated). In an embodiment, the motion information may be detected by the block matching shown in FIG. 16. In the block matching, the predicted signal to minimize the sum of absolute differences from the original signal (pixel signal) of the target block is detected from a reconstructed picture acquired via line L104.

Figure 5:
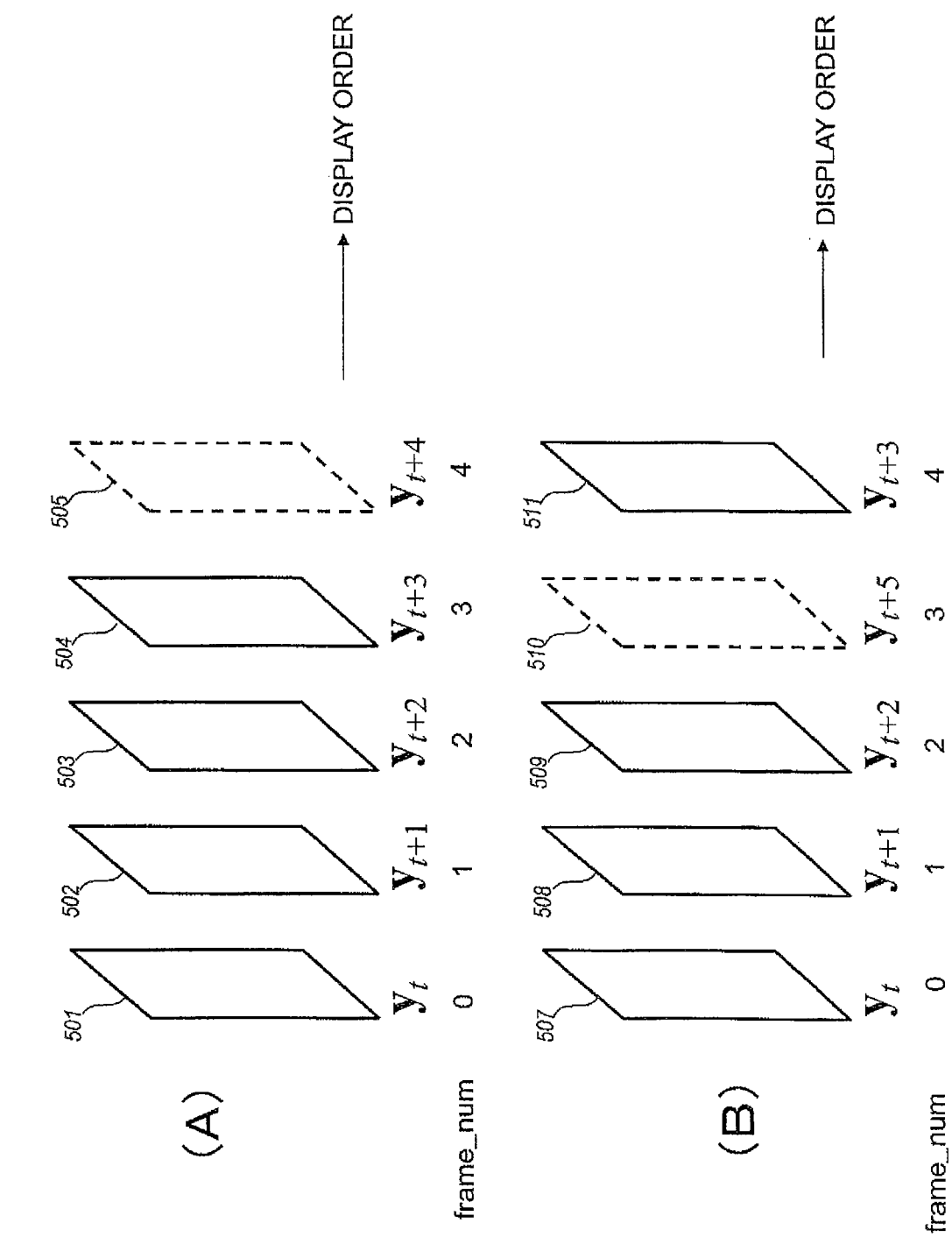
FIG. 5 is a schematic diagram for explaining examples of encoding orders of pictures.

In an embodiment, the motion information may contain a motion vector, an identification of a reference picture list (List0 and List1 in FIG. 5), and a reference index (ref_idx in FIG. 5).

When each reference picture list is composed of a plurality of reference pictures as shown in FIG. 6, the reference index is detected simultaneously with the motion vector, in order to indicate which reference picture is a target of the motion vector in the motion information. When bi-predictive prediction is used, a prediction type (forward/backward/two-way) is also determined at the same time. When the prediction type is the forward prediction, the motion information with the reference picture list identification of List0 is detected; when the prediction type is the backward prediction, the motion information with the reference picture list identification of List1 is detected. In the case of the bi-predictive prediction, two pieces of motion information identified by List0 and List1 are detected. The reconstructed pictures registered in the reference picture lists shown in FIG. 6 may be automatically determined in accordance with a predetermined rule, or information to specify the reconstructed pictures registered in the reference picture lists may be explicitly encoded in frame units or in sequence units. In an embodiment, frame numbers may be used as the information, as shown in FIGS. 5 and 6.

Referring back to FIG. 1, the motion information and the prediction type are output via line L103*c* and via line L103*b* to the prediction information memory 113 and to the prediction information encoding unit 114, respectively.

The prediction information memory 113 stores the input motion information and prediction type.

The prediction information encoding unit 114 entropy-encodes the motion information of the encoding target block and outputs encoded data via line L114 to the output terminal 112. There are no particular restrictions on a method of the entropy encoding, but it may be the arithmetic coding, variable-length coding, or the like.

The predicted signal generated by the predicted signal generation unit 103 is output via line L103*a* to the subtraction unit 105 and to the addition unit 110.

The subtraction unit 105 subtracts the predicted signal of the target block input via line L103*a*, from the pixel signal of the target block to generate a residual signal. The subtraction unit 105 outputs the residual signal via line L105 to the transform unit 106.

The transform unit 106 performs a discrete cosine transform of the input residual signal to generate transform coefficients. The quantization unit 107 quantizes the transform coefficients generated by the transform unit 106, to generate quantized transform coefficients. The quantized transform coefficient encoding unit 111 entropy-encodes the quantized transform coefficients generated by the quantization unit 107. The encoded data generated by the quantized transform coefficient encoding unit 111 is output via line L111 to the output terminal 112. There are no particular restrictions on a method of the entropy encoding in the quantized transform coefficient encoding unit 111, but it may be arithmetic coding, variable-length coding, or the like.

The output terminal 112 outputs the information received from the prediction information encoding unit 114 and the information from the quantized transform coefficient encoding unit 111, together to the outside.

The inverse quantization unit 108 performs inverse quantization of the quantized transform coefficients generated by the quantization unit 107, to generate transform coefficients.

The inverse transform unit 109 applies an inverse discrete cosine transform to the transform coefficients generated by the inverse quantization unit 108, to restore a residual signal. The addition unit 110 adds the restored residual signal to the predicted signal input provided via line L103a, to generate a reconstructed pixel signal of the encoding target block and stores the reconstructed pixel signal into the frame memory 104. It is also possible to adopt other transform processes replacing the processes of the transform unit 106 and the inverse transform unit 109. It is also noted that the transform unit 106 and the inverse transform unit 109 are not always essential. In this manner, the reconstructed pixel signal of the encoding target block is stored as a part of a reference picture or reconstructed picture in the frame memory 104, in order to be used for generation of a predicted signal of a subsequent encoding target block.

In an embodiment, the predicted signal generation unit 103 can also generate the predicted signal of the target block by making use of the motion information associated with blocks neighboring the target block (neighboring blocks). The motion information associated with a neighboring block is motion information used in generation of the predicted signal when the neighboring block was an encoding target. The motion information associated with the neighboring blocks is stored in the prediction information memory 113. For each block, information to indicate that the predicted signal was generated by making use of the motion information associated with the neighboring blocks, or information to indicate that the predicted signal was generated by making use of the motion vector detected by the block matching may be included in an encoded state in compressed data.

Figure 7:
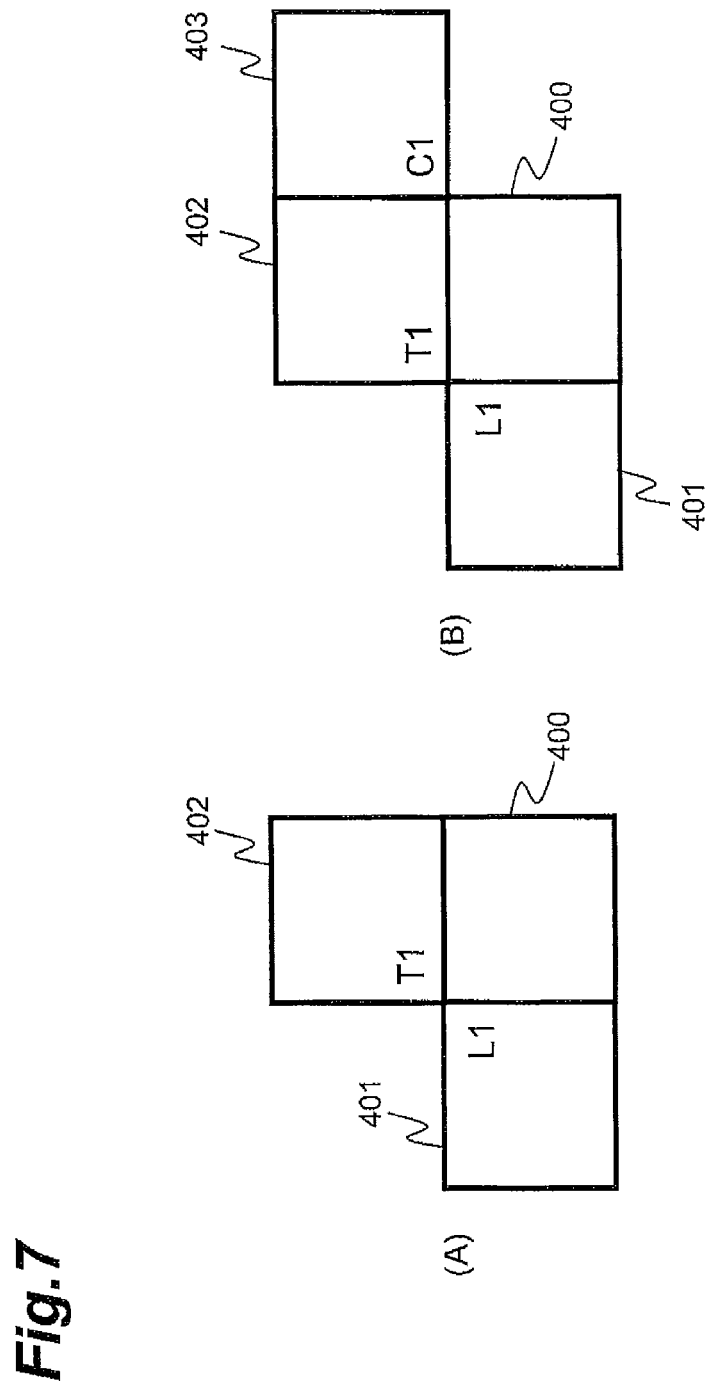
FIG. 7 is a drawing for explaining examples of neighboring blocks.

Now, let us consider the case where the predicted signal of the target block is generated by the bi-predictive prediction. It will be described below using an example of (A) in FIG. 7. Neighboring blocks are two blocks 401 and 402 neighboring the target block 400, which are located immediately on the left side of and immediately above the target block 400, and the motion information associated with these blocks is used for the prediction. In this case, if the prediction type associated with the two neighboring blocks is the bi-predictive prediction, up to four pieces of motion information can be used for generation of the predicted signal of the target block. The predicted signal generation unit 103 selects two pieces of motion information having different values of motion vectors or different values of frame numbers of reference pictures, from the four pieces of motion information as candidates (four pieces of candidate motion information). A frame number (frame_num) of a reference picture can be identified by a combination of a reference picture list identification (List0 or List1) and a reference index (ref_idx). Then two predicted signals are acquired from the frame memory 104 on the basis of the respective pieces of motion information, and the two predicted signals are averaged in pixel units to obtain a predicted signal. If the two predicted signals resemble each other, the prediction performance is improved by the effect of noise removal owing to smoothing.

The prediction information encoding unit 114 encodes information (indication information) to identify the two pieces of motion information used in the generation of the predicted signal of the target block out of the four pieces of candidate motion information, instead of the motion information. Therefore, the predicted signal may be generated in a bit count that is smaller than that of the encoded data obtained by encoding the motion information. The indication information may be two pieces of indication information to identify the respective pieces of candidate motion information, or may be a piece of indication information to identify the combination of the two pieces of candidate motion information.

The prediction information memory 113 stores the two pieces of motion information actually used in the generation of the predicted signal of the target block, as motion information associated with the target block. The two pieces of motion information may be stored as they are, but since the existing image predictive encoding and decoding processes have the restriction to refer to the two reference picture lists of List0 and List1, the two pieces of motion information can be stored as described below.

Namely, when the two pieces of motion information have the same reference picture list identification, the reference picture list identification in the two pieces of motion information can be modified in accordance with a predetermined rule. For example, of the two pieces of motion information, the reference picture list identification of one piece of motion information with a smaller reference index (ref_idx) is assigned to List0, and the reference picture list identification of the other piece of motion information is assigned to List1.

When the two pieces of motion information also have the same reference index, the reference picture list identification of one piece of motion information with the motion vector having the smaller sum of absolute values of respective components thereof is assigned to List0, and the reference picture list identification of the other piece of motion information is assigned to List1.

If this assignment results in referring to a frame number different from the frame number before the assignment, the reference index (ref_idx) can be modified so as to enable reference to the frame number before the assignment.

If the two reference picture lists do not include any identical frame number as shown in (B) of FIG. 6, the motion information may be managed using reference picture lists (523) extended so as to include the same frame numbers as shown in (C) of FIG. 6. The extended reference picture lists may be used directly in the case where the predicted signal of the target block is generated using the motion information associated with neighboring blocks. Since the frame numbers are recorded, they are also applicable to cases where the motion vector is scaled according to the distance in the temporal direction between pictures (e.g., each vector component is doubled when the motion vector to the target of the picture 504 in (A) of FIG. 5 is converted into the motion vector to the target of the picture 503). Since the motion vector storage methods described herein can be converted from one to another, any one of the storage methods can be applied with no influence on the encoding result.

Figure 2:
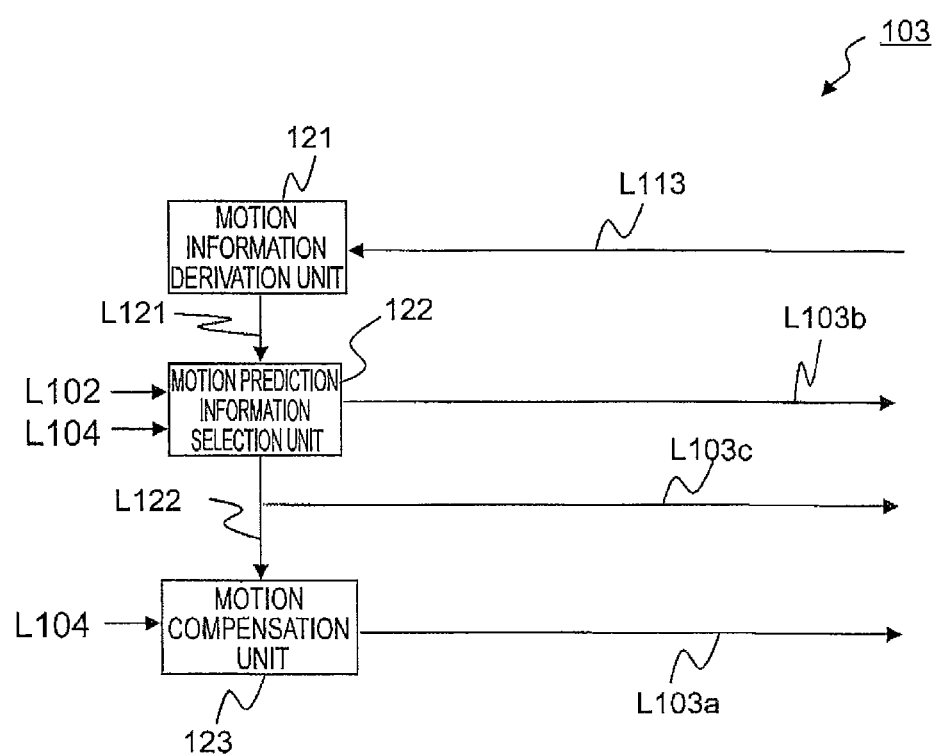
FIG. 2 illustrates an example configuration of a predicted signal generation unit shown in FIG. 1.

The processing of the predicted signal generation unit 103 will be further described in detail. FIG. 2 is a drawing showing a configuration of the predicted signal generation unit 103 according to an embodiment. As shown in FIG. 2, the predicted signal generation unit 103 is provided with a motion information derivation unit 121, a motion prediction information selection unit 122, and a motion compensation unit 123. In this drawing, the part of motion detection by the conventional block matching is omitted.

When both of the prediction types of the immediately above and immediately left blocks used as neighboring blocks are bi-predictive prediction, the motion information derivation unit 121 compares four pieces of motion information associated with these neighboring blocks. The motion information derivation unit 121 defines motion information having a different value of any one of elements constituting the motion information, which are the motion vector, the reference picture list identification, and the reference index, from those of the other three pieces of motion information, as candidate motion information applicable to the prediction of the target block. If there are two or more pieces of motion information with the same motion vector value and the same frame number value of the reference picture (the frame number of the reference picture can be identified by the combination of the reference picture list and the reference index), one of them is defined as candidate motion information. Then the motion information derivation unit 121 derives a set of any two pieces of candidate motion information, as candidate bi-predictive prediction information. In this case, up to six pieces of candidate bi-predictive prediction information can be derived. In cases where at least one of the immediately above and immediately left blocks to the target block is employed as a neighboring block and where the prediction is bi-predictive prediction, combination patterns of two pieces of motion information as many as the patterns described below can be derived from the neighboring blocks. Namely, the combination patterns are as follows.

(1) 2 patterns: in cases where two pieces of motion information of the immediately above block (402) or the immediately left block (401) are employed.

(2) 4 patterns: in cases where one piece of motion information of the immediately above block (402) and one piece of motion information of the immediately left block (401) are employed and where the reference picture lists in the selected two pieces of motion information are different.

(3) 2 patterns: in cases where one piece of motion information of the immediately above block (402) and one piece of motion information of the immediately left block (401) are employed and where the reference picture lists in the selected two pieces of motion information are the same.

Figure 3:
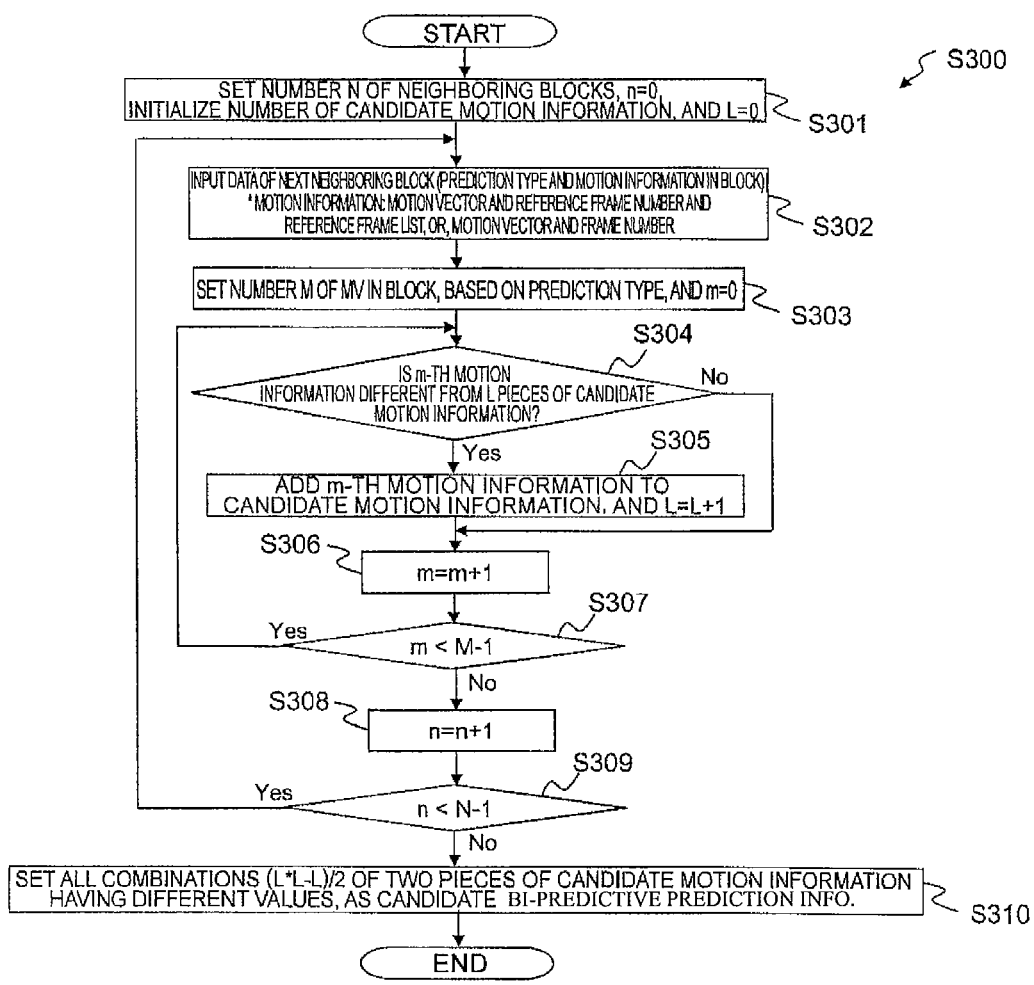
FIG. 3 is a flowchart showing an example of a process of a motion information derivation unit shown in FIG. 2.

FIG. 3 shows a flowchart of the processing carried out by the motion information derivation unit 121. First, in step S301 the number N of neighboring blocks to be used in the prediction of the target block is set and the current neighboring block number n is set to "0." For example, n=0 is set for block 401 and n=1 for block 402. Furthermore, the number L of pieces of candidate motion information is initialized to 0. Then the motion information and prediction type of the n-th block are acquired from the prediction information memory 113 (step S302). Thereafter, the number M of pieces of motion information associated with the n-th neighboring block is set based on the prediction type (step S303).

Next, the m-th motion information of the n-th neighboring block is compared with the L pieces of candidate motion information (step S304). If all the pieces of candidate motion information are different from the motion information of the comparison target, or if L=0, the processing proceeds to step S305. In step S305, the m-th motion information of the n-th neighboring block is added to the candidate motion information and the value of L is given an increment of 1. Thereafter, the processing proceeds to step S306.

If step S304 results in finding the same as the m-th motion information in the candidate motion information, the processing proceeds to step S306. In step S304, if values of two motion vectors in comparison are identical and if frame numbers corresponding to two sets of reference indices and reference picture list identifications in comparison are identical, the motion information is determined to be identical even with difference of the reference picture lists. A reason for it is that when the motion vectors of two pieces of motion information and the frame numbers of reference pictures thereof are identical, predicted signals generated from these pieces of motion information become coincident.

In step S306, the value of m is given an increment of 1. In subsequent step S307, it is determined whether the processes of steps S304 to S306 are completed, for all the pieces of motion information associated with the n-th neighboring block; if they are completed, the processing proceeds to step S308; if they are not completed, the processing returns to step S304.

In step S308, the value of the number n of the neighboring block is given an increment of 1. Then in step S309, it is determined whether the processing is completed for all the neighboring blocks. If it is completed, the processing proceeds to step S310; if it is not completed, the processing returns to step S302.

Finally, in step S310, every set of two pieces of motion information having different values of motion vectors or different values of frame numbers of reference pictures (the frame number of each reference picture can be identified by the combination of the reference picture list and the reference index) is derived from the L pieces of candidate motion information and is set as candidate bi-predictive prediction information.

Concerning the motion information from which neighboring blocks the motion information derivation unit 121 uses, it may be preliminarily determined for both of the encoding side and the decoding side. Furthermore, information to specify the motion information from which neighboring blocks the motion information derivation unit 121 used may be transmitted in an encoded state to the decoding side.

The motion prediction information selection unit 122 selects an optimum piece from the candidate bi-predictive prediction information input via line L121 from the motion information derivation unit 121. Specifically, it selects the candidate bi-predictive prediction information to minimize the sum of absolute differences between the "signal obtained as an average of two signals acquired via line L104 from the frame memory 104 on the basis of two pieces of candidate motion information" and the "pixel signal of the target block acquired via line L102." Then indication information to identify the selected candidate bi-predictive prediction information or to identify the two pieces of candidate motion information constituting the selected candidate bi-predictive prediction information is output via line L103b to the prediction information encoding unit.

Furthermore, the motion prediction information selection unit 122 outputs the selected two pieces of motion information via line L103c to the prediction information memory 113 so as to make the information stored therein, and outputs the information via line L122 to the motion compensation unit 123. The motion compensation unit 123 averages two reconstructed pixel signals extracted from the reconstructed pictures acquired via line L104, based on the two input pieces of motion information, to generate a predicted signal, and outputs the predicted signal via line L103a to the subtraction unit 105 and to the addition unit 110.

Figure 4:
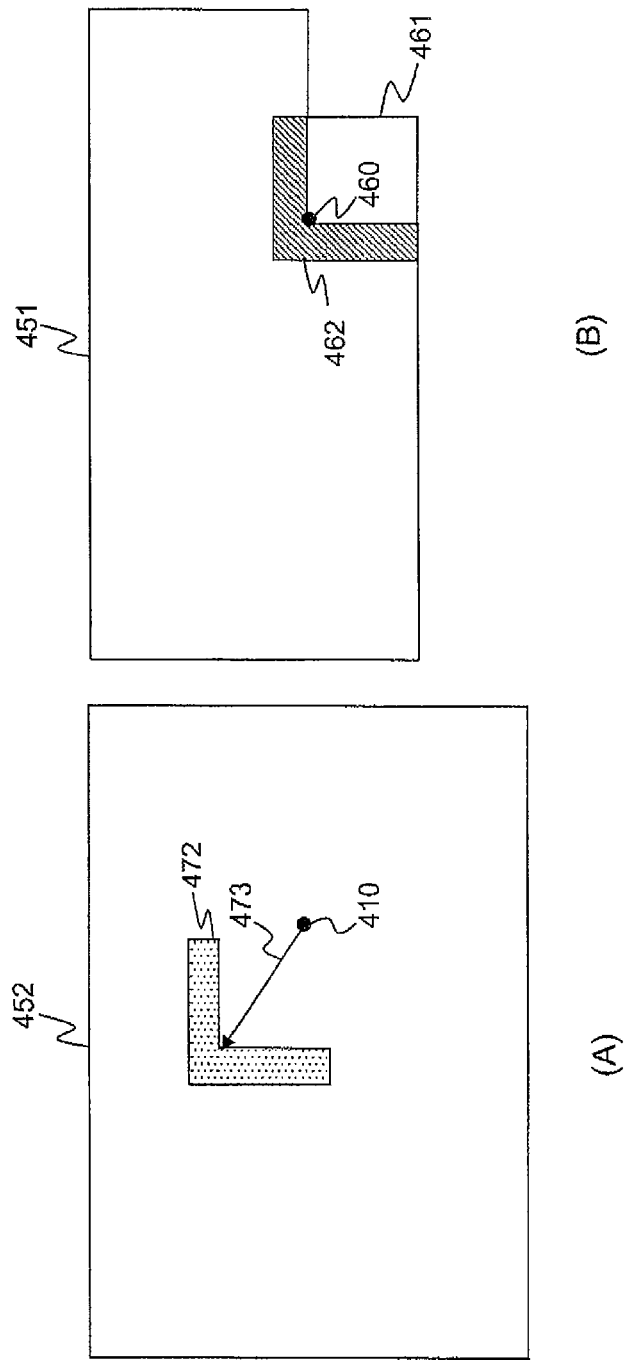
FIG. 4 is a schematic diagram for explaining an example of a technique for selecting one piece of candidate prediction information from candidate motion prediction information (combination of two pieces of motion information) using neighboring pixels to a target block.

There are no particular restrictions on the technique of selecting one optimum piece of candidate bi-predictive prediction information in the motion prediction information selection unit 122. For example, as shown in FIG. 4, instead of a pixel signal of a target block 461 in an encoding target picture 451, a reconstructed region (462) of an inverted L-shape neighboring the block 461 may be used. Since the region 462 is the reconstructed region, the decoding device can also use it. As shown in the drawing, a predicted region (472) corresponding to the region 462 can be acquired from the reference picture 452 on the basis of one piece of motion information 473. For every piece of candidate bi-predictive prediction information, inverted L-shape regions can be acquired from two pieces of candidate motion information and signals thereof are averaged to find the candidate bi-predictive prediction information to minimize the sum of absolute differences from the region 462. This technique allows the decoding device to select the same candidate bi-predictive prediction information as that selected by the encoding device, and thus provides the advantage of eliminating the need for transmission of the indication information.

In this manner, the predicted signal with a small difference from the original signal is generated from the motion information associated with the blocks neighboring the target block and two pieces of motion information having different values of motion vectors or different values of frame numbers of reference pictures (the frame number of each reference picture can be identified by the combination of the reference picture list and the reference index) are selected, whereby the bi-predictive prediction of the target block can be implemented without transmission of the motion information. Since the motion information contains the information to identify the reference picture list, it becomes feasible to perform the bi-predictive prediction using the motion information with the same reference picture list. Therefore, even if the reference pictures in two reference picture lists are completely different, the bi-predictive prediction can be carried out using motion vectors of the same reference picture. For example, when the bi-predictive prediction with two similar signals is carried out using the motion vectors of the same reference picture, improvement in prediction performance based on the smoothing effect may be expected.

Figure 9:
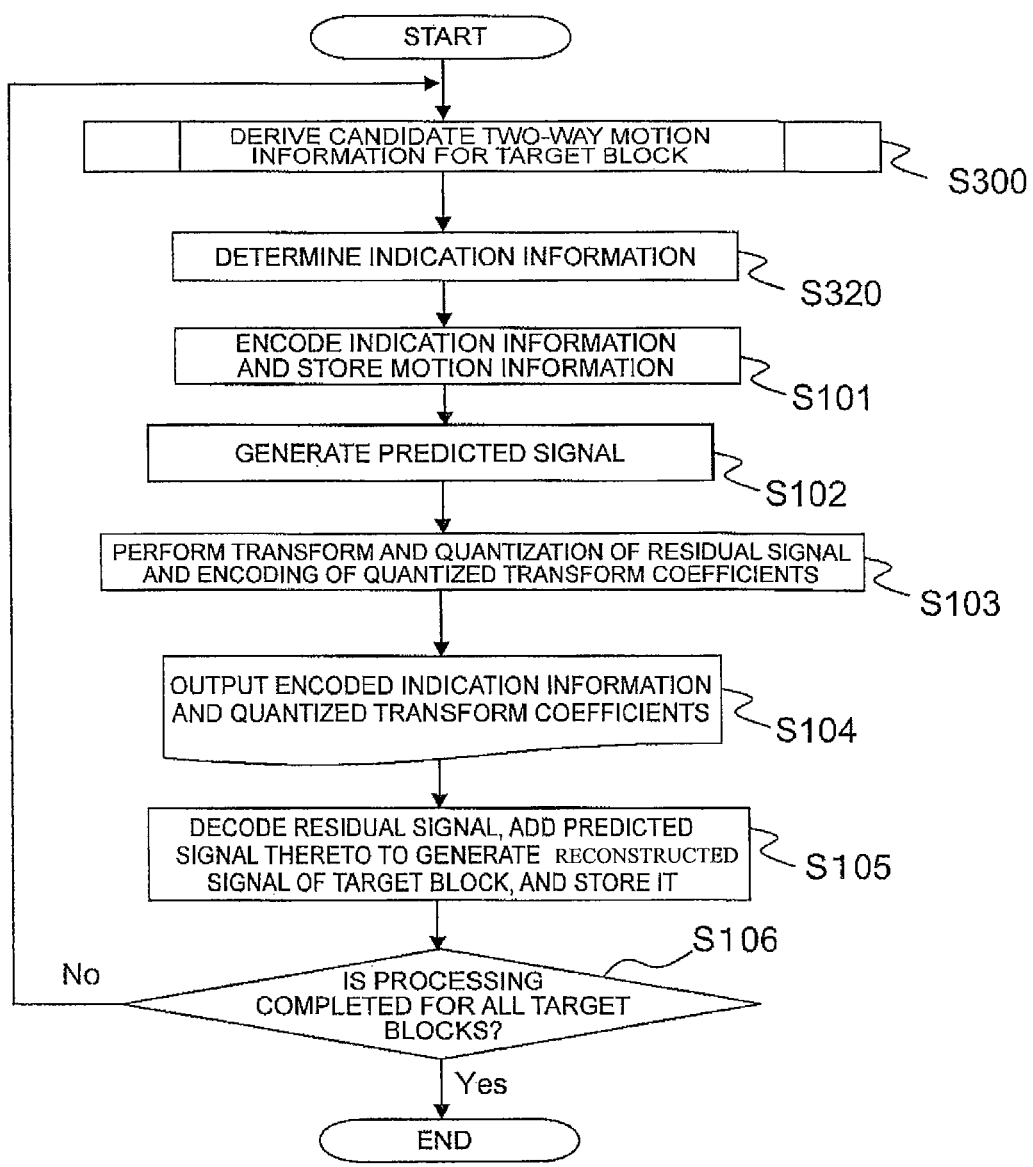
FIG. 9 is a flowchart showing an example procedure of an image predictive encoding method according to an embodiment.

FIG. 9 is a flowchart showing a procedure of an image predictive encoding method according to an embodiment. First, the block partition unit 102 partitions an input picture into 8×8 encoding blocks (the input picture may be partitioned in any other block size or shape or blocks of different sizes may be mixed in a picture).

Next, the motion information derivation unit 121 acquires the motion information associated with blocks neighboring a target block of an encoding target, from the prediction information memory 113 and extracts motion information having a different value of any one of the constituent elements thereof from the other motion information, as candidate motion information applicable to the prediction of the target block. Then a set of any two pieces of candidate motion information is derived as candidate bi-predictive prediction information (step S300). The details of this step S300 were already described with reference to FIG. 3.

Next, the motion prediction information selection unit 122 selects one to be used in generation of the predicted signal of the target block, from plural pieces of candidate bi-predictive prediction information. Then the motion prediction information selection unit 122 determines the indication information to identify the selected piece of candidate bi-predictive prediction information or to identify the two pieces of candidate motion information constituting the selected piece of candidate bi-predictive prediction information (step S320). In subsequent step S101, the selected two pieces of motion information are stored into the prediction information memory 113 and the prediction information encoding unit 114 encodes the indication information.

Next, in step S102 the motion compensation unit 123 acquires pixel signals from two reconstructed pictures acquired from the frame memory 104, based on the selected motion information, and averages these pixel signals to generate a predicted signal of the target block. In the prediction technique not using the motion information of neighboring blocks, the motion information is detected by the block matching described in FIG. 16 and the predicted signal of the target block is generated based on the motion information. The prediction information encoding unit 114 encodes the motion information and information for switching of the two prediction techniques. The motion information is stored into the prediction information memory 113.

Next, the residual signal indicative of the difference between the pixel signal of the encoding target block and the predicted signal is transformed and encoded by the transform unit 106, the quantization unit 107, and the quantized transform coefficient encoding unit 111 (step S103). Encoded data of the indication information and quantized transform coefficients is output through the output terminal 112 (step S104).

After these processes or in parallel with these processes, the encoded residual signal is decoded by the inverse quantization unit 108 and the inverse transform unit 109, for predictive encoding of a subsequent encoding target block. Then the addition unit 110 adds the decoded residual signal to the predicted signal to reconstruct a signal of the encoding target block. The reconstructed signal is stored as a reference picture (reconstructed picture signal) into the frame memory 104 (step S105). If the processing is not completed for all the encoding target blocks, the processing returns to step S101 to carry out the processing for the next encoding target block. If the processing is completed for all the encoding target blocks, the processing is terminated (step S106).

Figure 10:
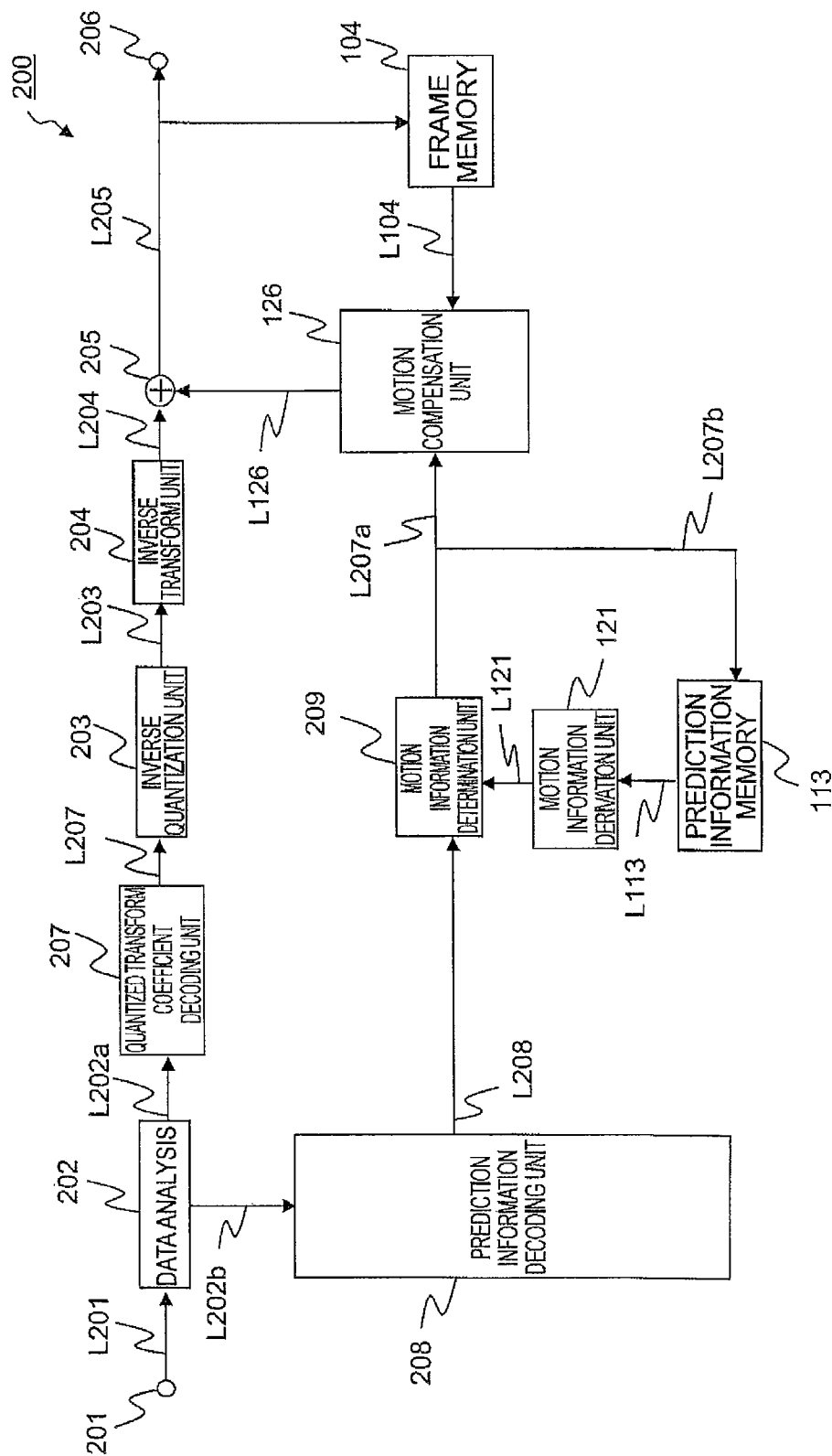
FIG. 10 illustrates an example configuration of an image predictive decoding device according to an embodiment.

Next, an image predictive decoding device according to an embodiment of the image predictive encoding and decoding system will be described. FIG. 10 is a block diagram showing the image predictive decoding device according 200 to an embodiment of the image predictive encoding and decoding system. The image predictive decoding device 200 may be a computing device or computer, including for example software, hardware, or a combination of hardware and software, as described later, capable of performing the described functionality. The image predictive decoding device 200 may be one or more separate systems or devices included in the image predictive encoding and decoding system, or may be combined with other systems or devices within the image predictive encoding and decoding system. In other examples, fewer or additional blocks may be used to illustrate the functionality of the image predictive decoding device 200. The image predictive decoding device 200 shown in FIG. 10 may include an input terminal 201, a data analysis unit 202, an inverse quantization unit 203, an inverse transform unit 204, an addition unit 205, an output terminal 206, a quantized transform coefficient decoding unit 207, a prediction information decoding unit 208, a frame memory 104, a motion information determination unit 209, a motion information derivation unit 121, a prediction information memory 113, and a motion compensation unit 126. The inverse quantization unit 203 and the inverse transform unit 204 function as residual signal decoding unit or means and the prediction information memory 113 functions as motion information recording unit or means. The residual signal decoding performed by the inverse quantization unit 203 and the inverse transform unit 204 may be performed by any means other than these in other embodiments. Furthermore, the inverse transform unit 204 may be excluded in other embodiments. Also, the frame memory 104 and the prediction information memory 113 may be one or more computer readable storage medium, as described later.

The input terminal 201 implements input of compressed data compressively encoded by the aforementioned image predictive encoding method. This compressed data contains, for each of the blocks, encoded data obtained by entropy encoding of quantized transform coefficients generated by transform and quantization of the residual signal, encoded data of the prediction information, i.e., encoded data of motion information for generation of the predicted signal of the block or indication information to identify the motion information to be used in generation of the predicted signal of the decoding target block from the motion information associated with neighboring blocks, and encoded data of information to indicate which of the motion information and the indication information is encoded.

The data analysis unit 202 analyzes the compressed data input into the input terminal 201, separates the compressed data into encoded data of quantized transform coefficients and encoded data of prediction information, for a decoding target block, and outputs these encoded data via line L202a and via line L202b to the quantized transform coefficient decoding unit 207 and to the prediction information decoding unit 208, respectively.

The prediction information decoding unit 208 entropy-decodes the encoded data of motion information or indication information. The decoded motion information is sent via line L208 to the motion information determination unit 209 and is then output without change via line L207a and line L207b to the motion compensation unit 126 and the prediction information memory 113. The prediction information memory 113 stores the motion information and the motion compensation unit 126 acquires a pixel signal from a reconstructed picture acquired from the frame memory 104, based on the motion information, and generates the predicted signal of each prediction block in the decoding target block, using the pixel signal. The generated predicted signal is output via line L126 to the addition unit 205.

On the other hand, when the prediction information decoding unit 208 entropy-decodes the encoded data of indication information, the motion information derivation unit 121 functions. The motion information derivation unit 121, as described in detail with reference to FIG. 3, acquires the motion information associated with blocks neighboring the decoding target block, from the prediction information memory 113, and extracts information having different values of any one of constituent elements thereof, as candidate motion information applicable to the prediction of the decoding target block. Then the motion information derivation unit 121 derives a set of any two pieces of candidate motion information as candidate bi-predictive prediction information and outputs the candidate bi-predictive prediction information via line L121 to the motion information determination unit 209.

The motion information determination unit 209 selects one piece of candidate bi-predictive prediction information identified by the indication information input via line L208, from plural pieces of candidate bi-predictive prediction information input via line L121. The two pieces of motion information constituting the selected candidate bi-predictive prediction information are output via line L207a and via line L207b to the motion compensation unit 126 and to the prediction information memory 113. The prediction information memory 113 stores the motion information and the motion compensation unit 126 acquires pixel signals from reconstructed pictures acquired from the frame memory 104, based on the two pieces of motion information, and generates a predicted signal of each prediction block in the decoding target block, using the pixel signals. The generated predicted signal is output via L126 to the addition unit 205.

The quantized transform coefficient decoding unit 207 entropy-decodes the encoded data of quantized transform coefficients of the residual signal in the encoding target block, and outputs the restored quantized transform coefficients via line L207 to the inverse quantization unit 203.

The inverse quantization unit 203 performs inverse quantization of the quantized transform coefficients of the decoding target block input via line L207, to generate transform coefficients. The inverse transform unit 204 performs an inverse discrete cosine transform of the transform coefficients to restore a residual signal. The residual signal is output to the addition unit 205 via line L204.

The addition unit 205 adds the predicted signal generated by the predicted signal generation unit 103, to the residual signal restored by the inverse quantization unit 203 and the inverse transform unit 204, to generate a decoded pixel signal of the decoding target block. The decoded pixel signal is output via line L205 to the output terminal 206 and the frame memory 104. The output terminal 206 outputs a reconstructed picture including the decoded pixel signal, to the outside (e.g., a display).

The frame memory 104 stores as a reference picture the reconstructed picture output from the addition unit 205, which is used as a reconstructed picture for reference for the next decoding process.

Figure 11:
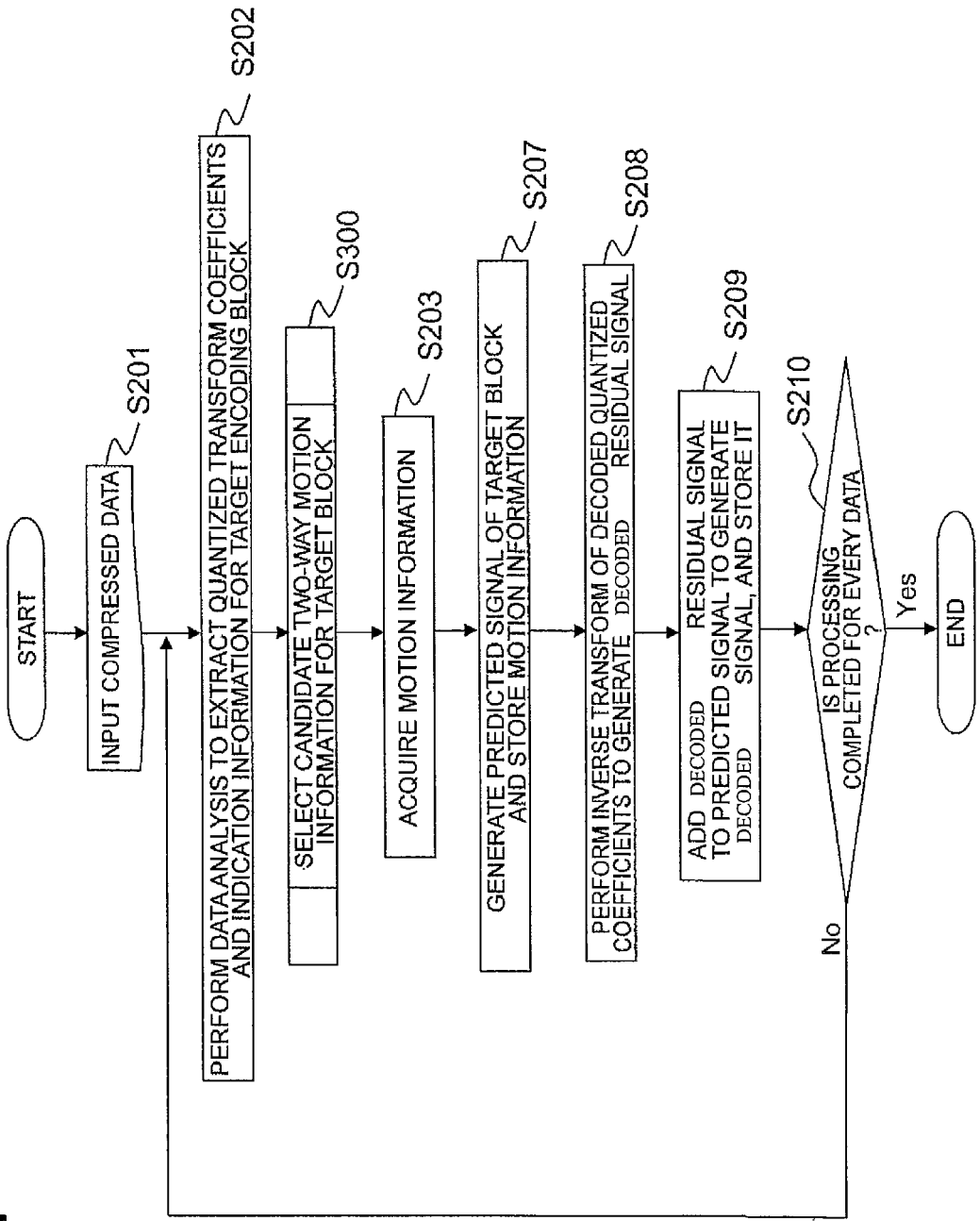
FIG. 11 is a flowchart showing an example procedure of an image predictive decoding method according to an embodiment.

An image predictive decoding method according to an embodiment will be described below with reference to FIG. 11. First, compressed data is input through the input terminal 201 (step S201). Then the data analysis unit 202 performs the data analysis of the compressed data and extracts the encoded data of the motion information for generation of the predicted signal of the block or the indication information to identify the motion information used in the generation of the predicted signal of the decoding target block from the motion information associated with neighboring blocks, the encoded data of the information to indicate which of the motion information and the indication information is encoded, and the encoded data of quantized transform coefficients. The encoded data of motion information or the encoded data of indication information is decoded by the prediction information decoding unit 208.

When the motion information is restored, the motion compensation unit 126 generates the predicted signal of the decoding target block, based on the restored motion information. The restored motion information is stored in the prediction information memory 113.

When the indication information is restored, the motion information derivation unit 121 acquires the motion information of neighboring blocks from the prediction information memory 113. The motion information derivation unit 121 may acquire the motion information from predetermined neighboring blocks. The motion information may be acquired from neighboring blocks, based on the information transmitted from the encoding side.

Next, the motion information derivation unit 121, as shown in detail in FIG. 3, extracts motion information between which any one of constituent elements differs in value out of the acquired pieces of motion information, as candidate motion information applicable to the prediction of the decoding target block. Then the motion information derivation unit 121 derives a set of any two pieces of candidate motion information as candidate bi-predictive prediction information (step S300).

Next, the motion information determination unit 209 selects one piece of bi-predictive prediction information from the derived pieces of candidate bi-predictive prediction information, using the restored indication information, to restore two pieces of motion information (step S203).

Thereafter, the motion compensation unit 126 generates the predicted signal of the decoding target block, based on the restored two pieces of motion information, and stores the two pieces of motion information into the prediction information memory (S207).

Next, the quantized transform coefficients decoded by the quantized transform coefficient decoding unit 207 are inversely quantized by the inverse quantization unit 203 and the inverse transform unit 204 further applies the inverse transform to the output from the inverse quantization unit 203 to generate a decoded residual signal (S208).

Next, the generated predicted signal is added to the decoded residual signal to generate a decoded signal, and this decoded signal is stored into the frame memory 104, for decoding of the next decoding target block (step S209). Thereafter, when the determination in step S210 results in determining that there is the next compressed data, the processes of S202 to S209 are repeated (S210), thereby processing all data to the last.

Figure 12:
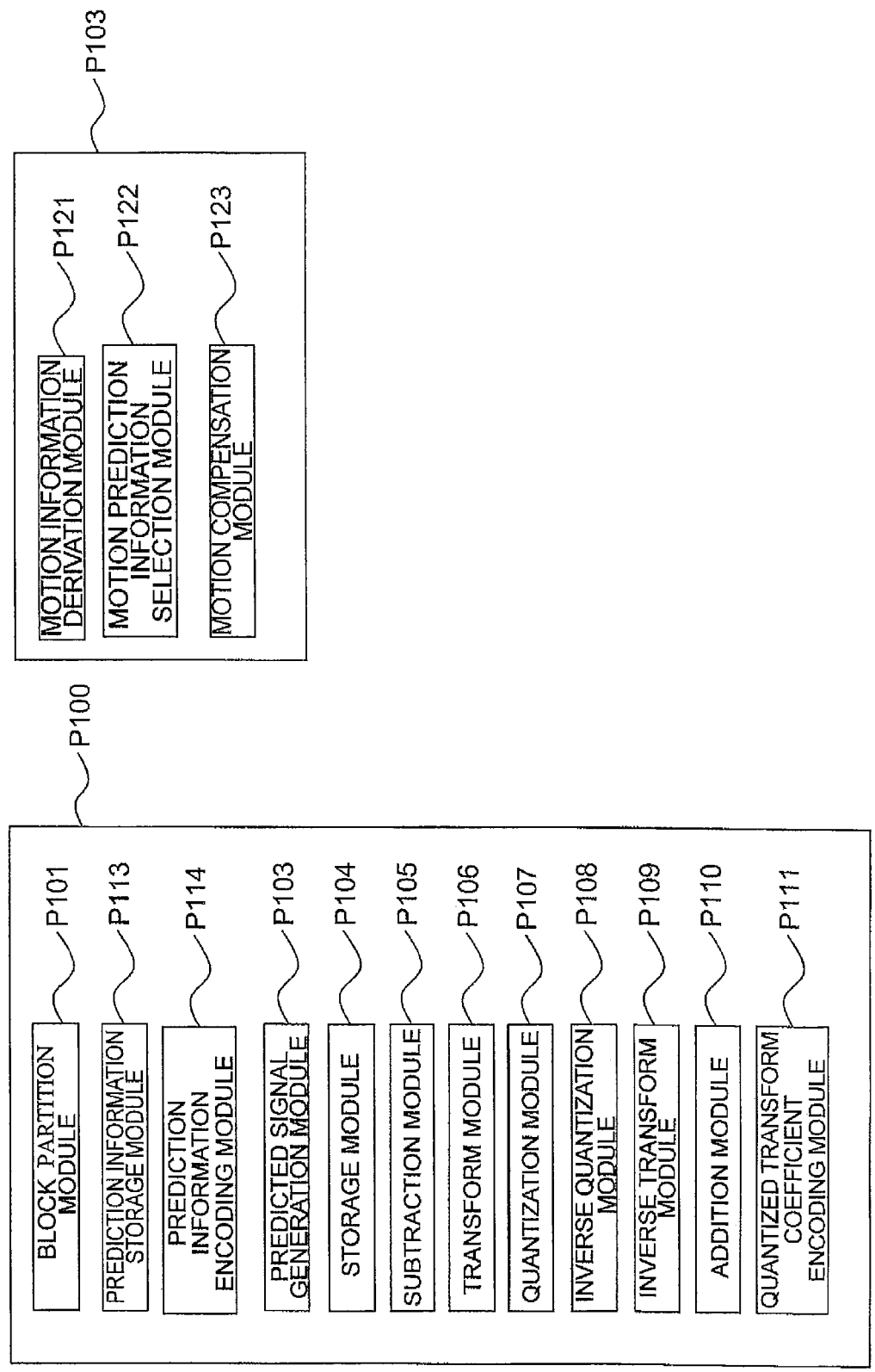
FIG. 12 illustrates an example of modules that are executable to perform image predictive encoding according to an embodiment.

FIG. 12 is a drawing showing a configuration of a program for causing a computer to execute image predictive encoding according to an embodiment of the image predictive encoding and decoding system. The image predictive encoding program P100 may be at least part of the previously discussed respective modules, and may include a block partition module P101, a predicted signal generation module P103, a storage module P104, a subtraction module P105, a transform module P106, a quantization module P107, an inverse quantization module P108, an inverse transform module P109, an addition module P110, a quantized transform coefficient encoding module P111, a prediction information storage module P113, and a prediction information encoding module P114. The predicted signal generation module P103 includes a motion information derivation module P121, a motion prediction information selection module P122, and a motion compensation module P123.

The functions that the block partition module P101, predicted signal generation module P103, storage module P104, subtraction module P105, transform module P106, quantization module P107, inverse quantization module P108, inverse transform module P109, addition module P110, quantized transform coefficient encoding module P111, prediction information storage module P113, prediction information encoding module P114, motion information derivation module P121, motion prediction information selection module P122, and motion compensation module P123 cause a computer to execute may be at least part of the respective functions of the block partition unit 102, predicted signal generation unit 103, frame memory 104, subtraction unit 105, transform unit 106, quantization unit 107, inverse quantization unit 108, inverse transform unit 109, addition unit 110, quantized transform coefficient encoding unit 111, prediction information memory 113, prediction information encoding unit 114, motion information derivation unit 121, motion prediction information selection unit 122, and motion compensation unit 123.

Figure 13:
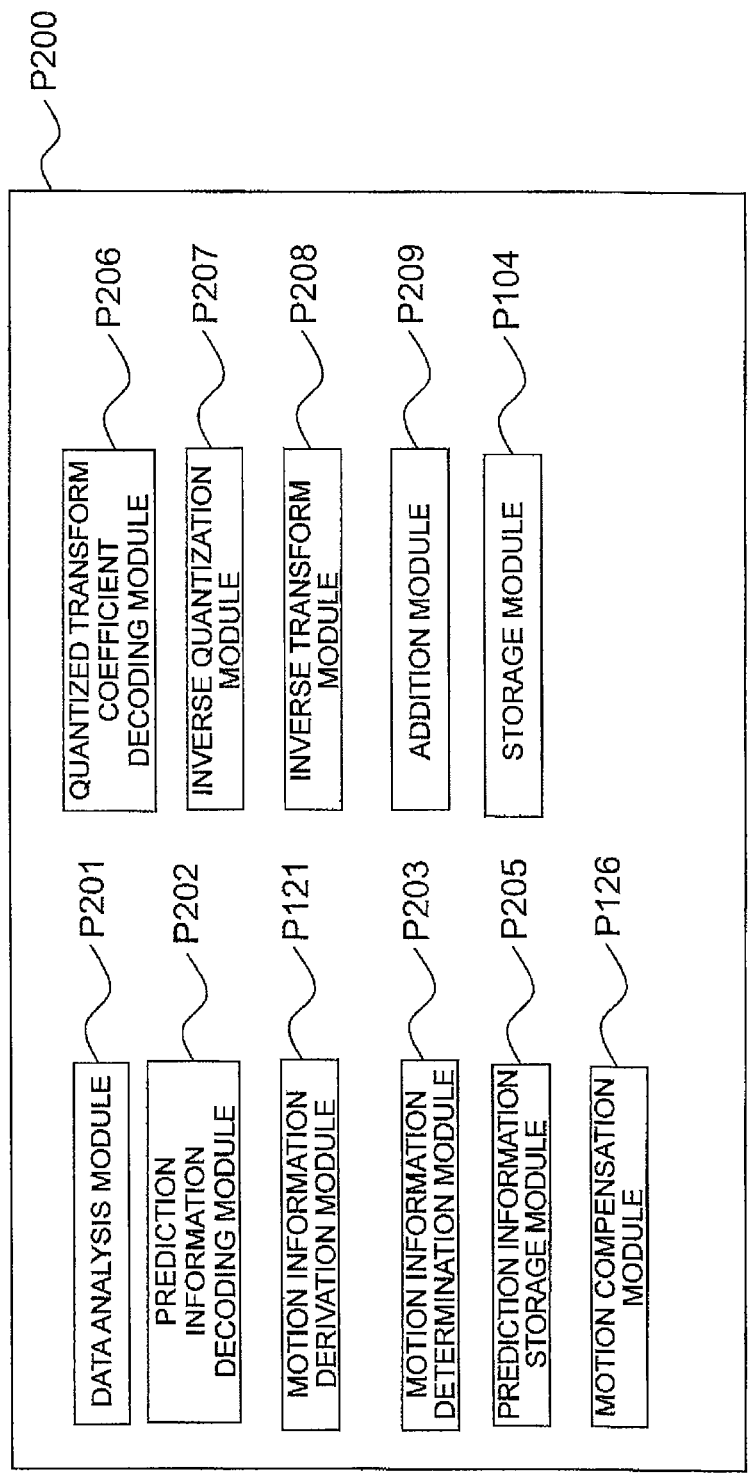
FIG. 13 illustrates an example of modules that are executable to perform image predictive decoding according to an embodiment.

FIG. 13 is a drawing showing a configuration of a program for causing a computer to execute image predictive decoding according to an embodiment of the image predictive encoding and decoding system. The image predictive decoding program P200 may be at least part of the previously discussed respective modules, and may include a data analysis module P201, a prediction information decoding module P202, a motion information derivation module P121, a motion information determination module P203, a prediction information storage module P205, a motion compensation module P126, a quantized transform coefficient decoding module P206, an inverse quantization module P207, an inverse transform module P208, an addition module P209, and a storage module P104.

The functions that the data analysis module P201, prediction information decoding module P202, motion information derivation module P121, motion information determination module P203, prediction information storage module P205, motion compensation module P126, quantized transform coefficient decoding module P206, inverse quantization module P207, inverse transform module P208, addition module P209, and storage module P104 cause a computer to execute may be at least part of the respective functions of the data analysis unit 202, prediction information decoding unit 208, motion information derivation unit 121, motion information determination unit 209, prediction information memory 113, motion compensation unit 126, quantized transform coefficient decoding unit 207, inverse quantization unit 203, inverse transform unit 204, addition unit 205, and frame memory 104.

The image predictive encoding program P100 or the image predictive decoding program P200 configured as described above is stored in a recording medium 10 and executed by a computer described below. Alternatively or in addition, at least a portion of the previously described image predictive encoding program P100 and the image predictive decoding program P200 may be stored in a working memory, and/or a memory, which are also non-transitory computer readable mediums.

Figure 14:
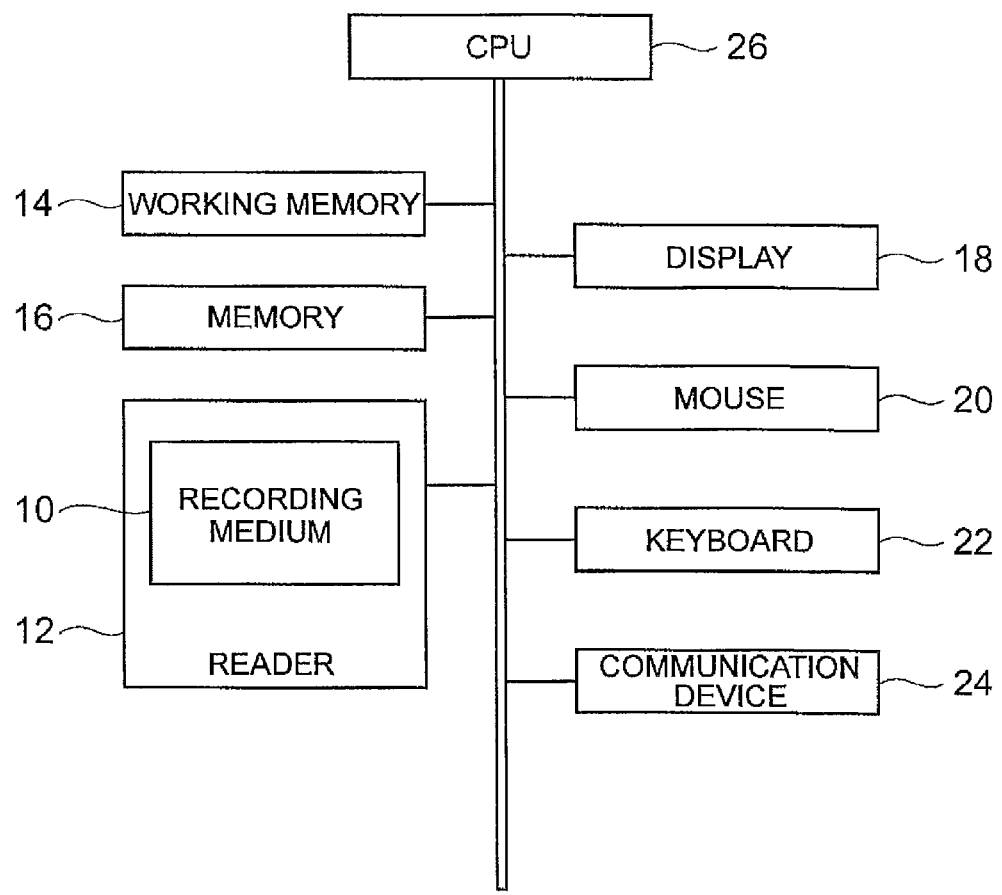
FIG. 14 illustrates an example hardware configuration of a computer for executing at least a portion of the image predictive encoding and decoding system.
Figure 15:
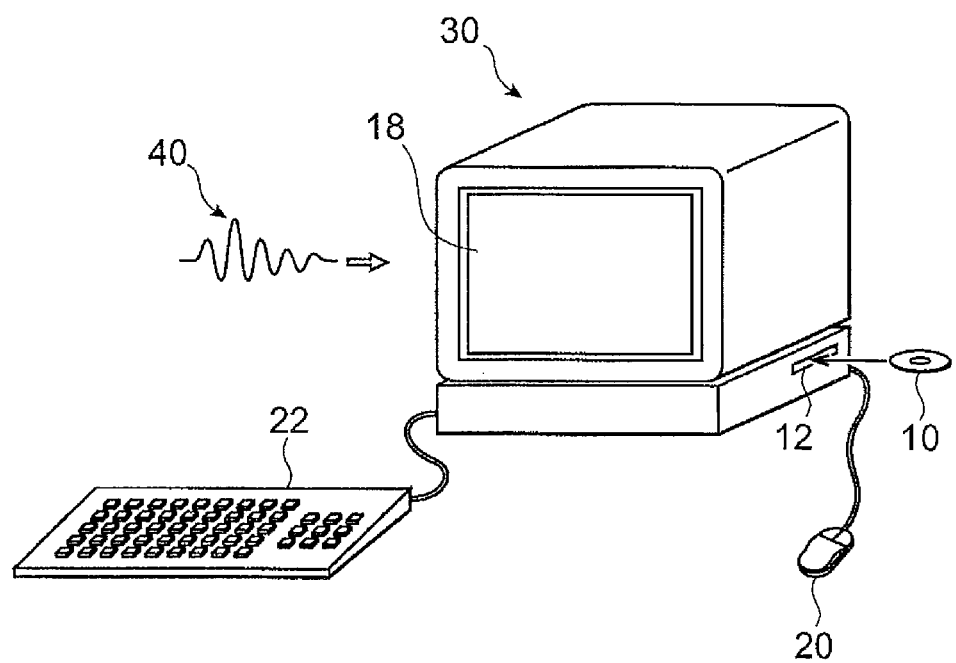
FIG. 15 is a perspective view of an example computer for executing the image predictive encoding and decoding system.

FIG. 14 is a drawing showing a hardware configuration of an example computer for executing a program, such as a program recorded in a recording medium and FIG. 15 is a perspective view of an example computer for executing a program, such as a computer program stored in a recording medium. Equipment that executes a program recorded in a recording medium is not limited to computers, but may be a DVD player, a set-top box, a cell phone, or the like provided with a CPU and configured to perform processing and control based on software.

As shown in the example of FIG. 14, a computer 30 is provided with a reading device 12 such as a floppy disk drive unit, a CD-ROM drive unit, or a DVD drive unit, a communication port such as a universal serial bus port (USB), Bluetooth port, an infrared communication port, or any other type of communication port that allows communication with an external device, such as another computer or memory device. The computer 30 may also include a working memory 14 that may include a resident operating system, a memory 16 that stores data, such as at least part of a program stored in a recording medium 10. In addition, the working memory 14 and/or the memory 16 may include the frame memory 104 and the prediction information memory 113. The working memory 14 and memory 16 may be one or more non-transitory computer readable storage medium, and can include a solid-state memory such as a memory card or other package that houses one or more non-volatile memories, such as read-only memories. Further, the computer readable medium can include a random access memory or other volatile re-writable memory. Additionally or alternatively, the computer-readable medium can include a magneto-optical or optical medium, such as a disk or tapes or any other non-transitory information storage medium to capture carrier wave signals such as a signal communicated over a transmission medium. A digital file attachment to an e-mail, stored in a storage medium, or other self-contained information archive or set of archives may be considered a non-transitory distribution medium that is a tangible computer readable storage medium. Accordingly, the embodiments are considered to include any one or more of a computer-readable storage medium or a non-transitory distribution storage medium and other equivalents and successor information storage media, in which data or instructions may be stored. In addition, the computer 30 may have a user interface that includes a monitor device 18 such as a display, a mouse 20 and a keyboard 22 as input devices, a touch screen display, a microphone for receipt of voice commands, a sensor, or any other mechanism or device that allows a user to interface with the computer 30. In addition, the computer 30 may include a communication device 24 for transmission/reception of data and others, and a central processing unit (CPU) 26 or processor to control execution of the program. The processor 26 may be one or more one or more general processors, digital signal processors, application specific integrated circuits, field programmable gate arrays, digital circuits, analog circuits, combinations thereof, and/or other now known or later developed devices for analyzing and processing data. In one example, when the recording medium 10 is put into the reading device 12, the computer 30 becomes accessible to the image predictive encoding program P100 or the image predictive decoding program P200 at least a portion of which can be stored in the recording medium 10, through the reading device 12, and becomes able to operate as the image predictive encoding device 100 or the image predictive decoding device 200, based on the image predictive encoding program P100 or the image predictive decoding program P200.

As shown in the example of FIG. 15, the image predictive encoding program and the image predictive decoding program may be those provided in the form of computer data signal 40 superimposed on a carrier wave, through a network. In this case, the computer 30 can save at least a portion of the image predictive encoding program or the image predictive decoding program received by the communication device 24, into the memory 16 and execute the image predictive encoding program or the image predictive decoding program following storage in the non-transitory computer readable medium.

The various embodiments were described above, but it should be noted that the image predictive encoding and decoding system can further include modifications as described below.

(Candidates for Motion Information)

In the above embodiment the motion information is composed of the motion vector, the reference picture list identification (List0 and List1 in FIG. 5), and the reference index (ref_idx in FIG. 5), but the motion information may be configured by replacing the reference picture list identification and the reference index with a frame number. A reason for it is that the same result and effect as in the above-described embodiment using the motion information associated with neighboring blocks can be achieved by use of the frame numbers.

(Restrictions on Candidate Two-Way Motion Information)

In the above embodiment the motion information derivation unit used all the combinations of candidate motion information as candidate two-way motion information, but only sets of motion information satisfying the conditions below may be adopted as candidate two-way motion information.

1) Only the immediately above and immediately left blocks to the target block.

2) Two pieces of motion information to indicate the same reference picture.

3) Two motion vectors which are not identical but have close values (the difference of absolute values of which is smaller than a certain value). Namely, the motion vector (MVXa,MVYa) of the immediately above block and the motion vector (MVXb,MVYb) of the immediately left block satisfy the following two relations:

$$(|MVXa-MVXb|!=0)\|(|MVYa-MVYb|!=0);$$

and $$(|MVXa-MVXb|<=N)\&\&(|MVYa-MVYb|<=N)$$

(where N is a small value).

If there is no candidate two-way motion information satisfying the conditions, the other prediction process may be used without transmission of the indication information.

The number of candidate two-way motion information may be designated in frame units or in block units and information to specify the designated number may be included in compressed data. Furthermore, information to indicate such application of the restrictions on the candidate two-way motion information may be encoded in frame units.

(Identification of Indication Information)

Figure 8:
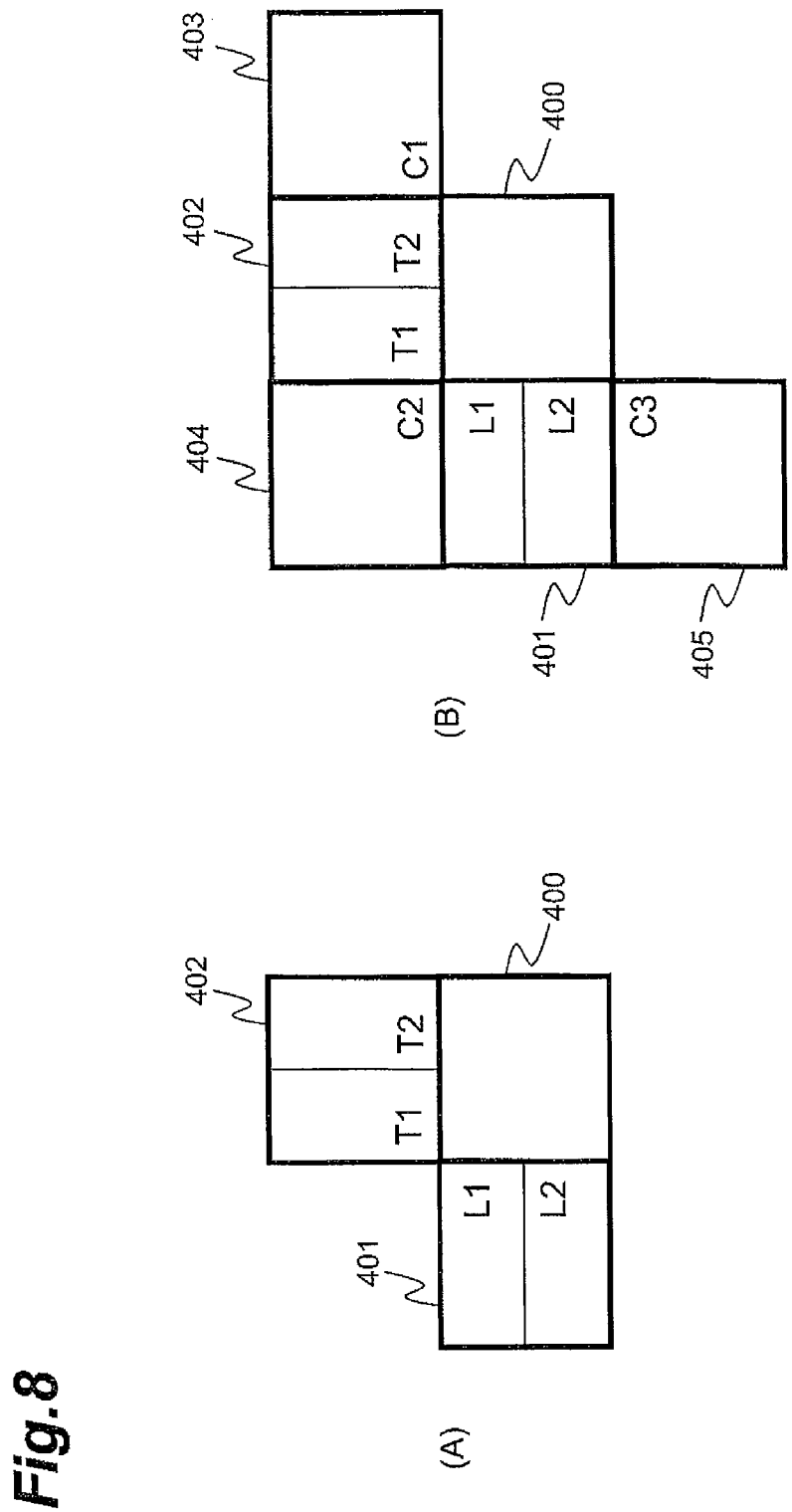
FIG. 8 is a drawing for explaining other examples of neighboring blocks.

In determining the identification of the indication information, a priority order of the immediately left block (401) and the immediately above block (402) may be determined using the motion information of the above right block (404 in FIG. 8) to the target block (400 in FIG. 8). If the motion vector of the immediately above block (MVXa,MVYa), the motion vector of the immediately left block (MVXb,MVYb), and the motion vector of the above left block (MVXc,MVYc) satisfy the relation of |MVXa−MVXc|+|MVYa−MVYc|<|MVXb−MVXc|+|MVYb−MVYc|, the motion information of the immediately left block is given an identification with a smaller bit count. If the relation is not met, the motion information of the immediately above block is given an identification with a smaller bit count. When a higher priority is put on the motion information of the neighboring block assumed to have a higher correlation with the target block in this manner, the bit count of the indication information can be reduced.

(Derivation and Selection of Candidate Motion Vector)

In the above embodiment the derivation and selection of candidate motion vector are carried out for the horizontal and vertical components of the motion vector together, but the derivation and selection of candidate motion vector may be individually performed for the horizontal component and the vertical component of the motion vector. In the above embodiment a single motion vector of a neighboring block was defined as a candidate motion vector, but it is also possible to define as a candidate motion vector an average of two motion vectors or a motion vector scaled according to the distance in the temporal direction between pictures (e.g., each vector component is doubled when the motion vector to the target of the picture 504 in (A) of FIG. 5 is converted into the motion vector to the target of the picture 503).

(Prediction Type)

In the above embodiment the prediction type for both of two neighboring blocks is the bi-predictive prediction, but the image predictive encoding and decoding systemcan also be used in cases where one of them is forward or backward prediction. In such cases, up to three pieces of candidate bi-predictive prediction information are derived. In these cases, combination patterns of two pieces of motion information as many as the patterns described below can be derived from neighboring blocks. Namely, the combination patterns are as follows:

(1) 1 pattern: in cases where two pieces of motion information of the immediately above block (402) or the immediately left block (401) are adopted;

(2) 1 pattern: in cases where one piece of motion information of the immediately above block (402) and one piece of motion information of the immediately left block (401) are employed and where the reference picture lists about the two pieces of motion information are different;

(3) 1 pattern: in cases where one piece of motion information of the immediately above block (402) and one piece of motion information of the immediately left block (401) are employed and where the reference picture lists about the two pieces of motion information are identical.

Furthermore, both of the two neighboring blocks may be the forward or backward prediction, or one of them may be the forward prediction and the other the backward prediction.

(Number of Neighboring Blocks)

There are no particular restrictions on the number of neighboring blocks applicable to the prediction of the target block. As in (B) of FIG. 7, three blocks 401 to 403 may be used as neighboring blocks. It is also possible to use motion information associated with a block of a preceding frame. If the neighboring blocks (401-405) are further partitioned as shown in FIG. 8, the motion information associated with such smaller blocks may be included in the candidate motion information. It is also possible to use motion information of a block which is not adjacent to the target block.

(N-predictive Prediction)

In the above embodiment the prediction method of the target block performed using the motion information associated with the neighboring blocks is the bi-predictive prediction, but the prediction method does not have to be limited to it, and may be uni-predictive prediction or tri-predictive prediction. In this case, step S310 in FIG. 3 may be configured to derive candidate N-predictive prediction information and select one therefrom. N pieces of motion information may be stored in that case, but in the case where N is three or more, the motion information to be stored may be limited to two, by the reference indices or the values of the motion vectors.

(Transform Unit and Inverse Transform Unit)

The transform process of the residual signal may be carried out in a fixed block size or the transform process may be carried out by further partitioning the target region according to a partial region.

(Color Signal)

In the description of the above embodiment there is no particular description about color format, but the predicted signal generation process may be carried out individually from a luminance signal, for a color signal or a color difference signal. The processing may also be carried out in synchronism with the processing of the luminance signal.

The image predictive encoding and decoding system has been described above in detail on the basis of the described embodiments. However, it should be noted that the image predictive encoding and decoding system is by no means limited to the above embodiments. The present invention can be modified in many ways without departing from the scope and spirit of the invention. It will be apparent to those of ordinary skill in the art that many more examples and implementations are possible within the scope of the system. Accordingly, the system is not to be restricted except in light of the attached claims and their equivalents

REFERENCE SIGNS LIST 100 image predictive encoding device; 101 input terminal; 102 block partition unit; 103 predicted signal generation unit; 104 frame memory; 105 subtraction unit; 106 transform unit; 107 quantization unit; 108 inverse quantization unit; 109 inverse transform unit; 110 addition unit; 111 quantized transform coefficient encoding unit; 112 output terminal; 113 prediction information memory; 114 prediction information encoding unit; 121 motion information derivation unit; 122 motion prediction information selection unit; 123 motion compensation unit; 201 input terminal; 202 data analysis unit; 203 inverse quantization unit; 204 inverse transform unit; 205 addition unit; 206 output terminal; 207 quantized transform coefficient decoding unit; 208 prediction information decoding unit; 209 motion information determination unit.

What is claimed is:

1. An image predictive decoding method executed by a decoding device, the method comprising:

extracting, with a processor, from compressed data prepared by an encoding device, encoded data of indication information and encoded data of a residual signal, the indication information including an identification, devoid of inclusion of any motion vector, of a motion information set utilized for generation of a predicted signal of a target region of a decoding target out of (i) a plurality of pieces of motion information associated with neighboring regions neighboring the target region in a decoding target frame and (ii) motion information associated with a region in the decoded preceding frame;

decoding with the processor either (a) the encode data of motion information to restore motion information which comprise a reference picture list identification, a reference picture index and a motion vector, or (b) the encoded data of indication information to restore the indication information;

deriving, with the processor, one or more motion information sets out of plural pieces of motion information stored in memory, each of the one or more motion information sets including two pieces of motion information between which respective frame numbers identified with respective reference picture list identification and respective reference picture index are different from each other, or between which respective motion vectors are different from each other;

determining, with the processor, from the one or more motion information sets, a motion information set to be used in generation of the predicted signal of the target region based on the indication information, Wherein motion vector included in the motion information associated with the region neighboring the target region in the decoded preceding frame is scaled according to a distance in a temporal direction between pictures of the decoding target frame and the decoded preceding frame and is used, when the motion information associated with the region neighboring the target region in the decoded preceding frame is included in the one or more motion information sets which are determined based on the indication information;

generating, with the processor, the predicted signal of the target region by combining two signals obtained from one or more reconstructed pictures stored in the memory, based on the two pieces of motion information associated with neighboring regions neighboring the target region in the frame to be decoded or the motion information set of the motion information associated with neighboring regions neighboring the target region in the frame to be decoded and the motion information associated with a region in the decoded previous frame;

storing motion information utilized for generation of the predicted signal of the target region in the memory;

restoring, with the processor, a residual signal of the target region from the encoded data of the residual signal;

reconstructing a pixel signal of the target region with the processor based on the predicted signal and the restored residual signal; and storing the reconstructed pixel signal as a pan of a reconstructed picture.

* * * * *

UNITED STATES PATENT AND TRADEMARK OFFICE
CERTIFICATE OF CORRECTION

PATENT NO. : 10,554,998 B2
APPLICATION NO. : 14/477463
DATED : February 4, 2020
INVENTOR(S) : Yoshinori Suzuki et al.

Page 1 of 1

It is certified that error appears in the above-identified patent and that said Letters Patent is hereby corrected as shown below:

In the Claims

Column 24, Claim 1, Line 57, delete "Wherein" and replace with --wherein--.

Column 25, Claim 1, Line 18, delete "pan" and replace with --part--.

Signed and Sealed this
Seventh Day of July, 2020

Andrei Iancu
*Director of the United States Patent and Trademark Office*